United States Patent [19]

Archer

[11] Patent Number: 4,686,436
[45] Date of Patent: Aug. 11, 1987

[54] ELECTRONIC CONTROL CIRCUIT, ELECTRONICALLY COMMUTATED MOTOR SYSTEM AND METHOD FOR CONTROLLING SAME, LAUNDRY APPARATUS, AND METHODS FOR OPERATING APPARATUS FOR SWITCHING HIGH VOLTAGE DC AND FOR CONTROLLING ELECTRICAL LOAD POWERING APPARATUS

[75] Inventor: William R. Archer, Fort Wayne, Ind.

[73] Assignee: General Electric Company

[21] Appl. No.: 628,224

[22] Filed: Jul. 6, 1984

[51] Int. Cl.[4] ............................................. H02P 6/02
[52] U.S. Cl. .................................. 318/254; 318/138; 318/439; 307/108
[58] Field of Search ..................... 318/138, 254, 439; 68/12 R; 307/106, 108, 126, 130, 139, 140

[56] References Cited

U.S. PATENT DOCUMENTS

| | | | |
|---|---|---|---|
| 3,152,462 | 10/1964 | Elliott et al. | 318/341 |
| 3,284,692 | 11/1966 | Gautherin | 321/16 |
| 3,293,532 | 12/1966 | Dubin et al. | 321/18 |
| 3,531,702 | 9/1970 | Hill | 318/254 X |
| 3,566,148 | 2/1971 | Wood | 307/106 |
| 3,577,057 | 5/1971 | Dyer et al. | 318/328 |
| 3,838,329 | 9/1974 | Michelet et al. | 232/289 |
| 4,020,361 | 4/1977 | Suelzle et al. | 307/106 |
| 4,161,023 | 7/1979 | Goffeau | 363/124 |
| 4,169,990 | 10/1979 | Erdman | 318/138 |
| 4,197,489 | 4/1980 | Dunn et al. | 318/138 |
| 4,208,706 | 6/1980 | Suzuki et al. | 363/26 |
| 4,250,544 | 2/1981 | Alley | 364/110 |
| 4,296,362 | 10/1981 | Beasley | 318/439 X |
| 4,302,717 | 11/1981 | Olla | 323/282 |
| 4,302,807 | 11/1981 | Mentler | 363/134 |
| 4,308,577 | 12/1981 | Mentler | 323/289 |
| 4,403,174 | 9/1983 | Miyazaki et al. | 318/138 X |
| 4,403,177 | 9/1983 | Weber et al. | 318/254 |
| 4,415,844 | 11/1983 | Mendenhall et al. | 318/254 |
| 4,479,078 | 10/1984 | Kidd et al. | 318/439 X |
| 4,493,017 | 1/1985 | Kammiller et al. | 323/289 |
| 4,494,049 | 1/1985 | Leitgeb | 318/138 |
| 4,495,450 | 1/1985 | Tokizaki et al. | 318/138 |
| 4,520,255 | 5/1985 | Bredenkamp et al. | 363/98 |
| 4,521,705 | 6/1985 | Bartels | 307/108 X |

Primary Examiner—William M. Shoop, Jr.
Assistant Examiner—Bentsu Ro
Attorney, Agent, or Firm—John M. Stoudt

[57] ABSTRACT

Electrical load powering apparatus has a load connection, a high voltage supply connection and a common, and includes electronic means for switching the high voltage supply connection to the load connection. The electronic switching means has an input and is responsive to a control voltage difference between the input and the load connection. The load connection is subject to high voltage excursions relative to the common due to the switching. An electronic control circuit for use in the electrical load powering apparatus includes a circuit having an active device for providing at least one pulse output relative to common and having at least one inherent capacitance. A circuit connected to the load connection inverts the pulse output of the circuit having the active device to produce the control voltage difference between the electronic switching means input and the load connection. An additional circuit charges the inherent capacitance of the circuit having the active device when one of the high voltage excursions occurs. An electronically commutated motor system, a regulated power supply and laundry apparatus utilizing the electronic control circuit are set forth. Methods for controlling the motor system, for operating apparatus for switching high voltage DC and for controlling electrical load powering apparatus generally are also described.

126 Claims, 8 Drawing Figures

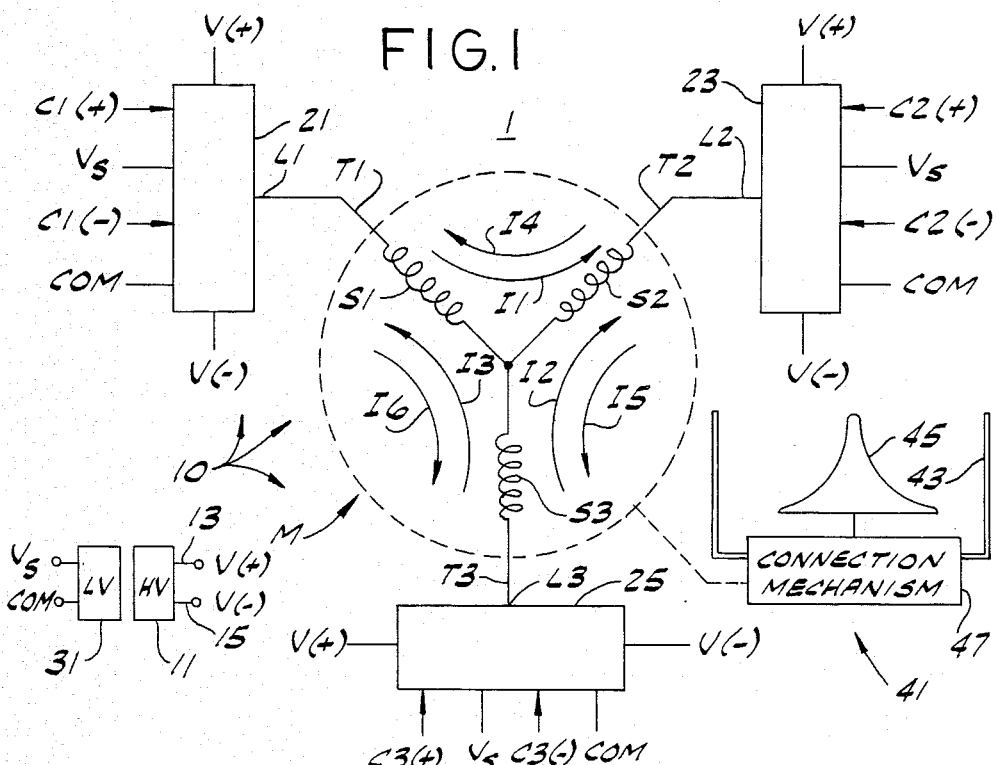
FIG.1
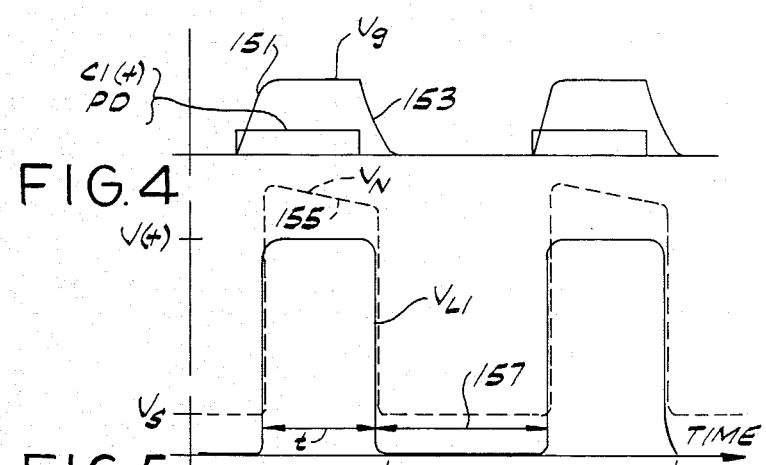
FIG.3
FIG.4
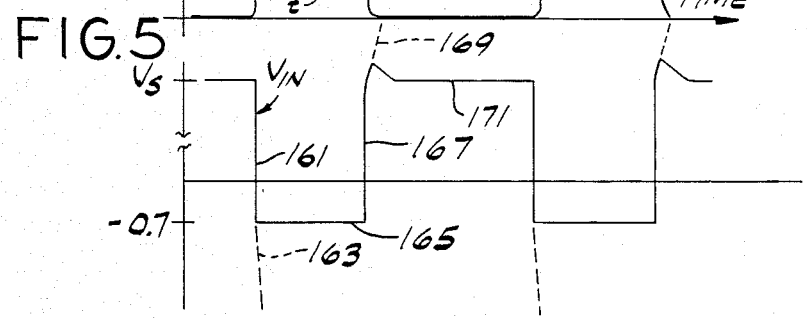
FIG.5

ELECTRONIC CONTROL CIRCUIT, ELECTRONICALLY COMMUTATED MOTOR SYSTEM AND METHOD FOR CONTROLLING SAME, LAUNDRY APPARATUS, AND METHODS FOR OPERATING APPARATUS FOR SWITCHING HIGH VOLTAGE DC AND FOR CONTROLLING ELECTRICAL LOAD POWERING APPARATUS

FIELD OF THE INVENTION

The present invention relates to electronic control circuits, electronically commutated motor systems and methods for controlling them, laundry apparatus, and methods for operating apparatus for switching high voltage direct current (DC) and for controlling electrical load powering apparatus. More particularly, the present invention relates to such circuits, systems, apparatus and methods for achieving reliable switching at relatively high voltages where inherent capacitance in circuits becomes an important consideration.

BACKGROUND OF THE INVENTION

Many forms of electrical load powering apparatus have a load connection, a voltage supply connection and a common, and electronic circuitry which switches the voltage supply connection to an electrical load. Without limiting the intended scope of applications of the invention, the background of the invention is discussed in regard to a relatively specific example of powering electronically commutated motors for domestic appliances such as laundry apparatus.

While conventional brush-commutated DC motors may have numerous advantageous characteristics such as convenience of changing operational speeds and direction of rotation, it is believed that there may be disadvantages, such as brush wear, electrical noise, and radio frequency interference caused by sparking between the brushes and the segmented commutator, that may limit the applicability of such brush commutated DC motors in some fields such as the domestic appliance field including the laundry apparatus field. Electronically commutated motors, such as brushless DC motors and permanent magnet motors with electronic commutation, have now been developed and generally are believed to have the above discussed advantageous characteristics of the brush-commutated DC motors without many of the disadvantages thereof while also having other important advantages. Such electronically commutated motors are disclosed in the David M. Erdman U.S. Pat. Nos. 4,005,347 and 4,169,990 and Floyd H. Wright U.S. Pat. No. 4,162,435, all of which are commonly assigned with the present application and are hereby incorporated by reference. These electronically commutated motors may be advantageously employed in many different fields or motor applications among which are domestic appliances, e.g., automatic washing or laundry machines such as disclosed in commonly assigned, co-pending U.S. patent application Ser. No. 412,421 filed Aug. 2 filed Apr. 13, 1982, now U.S. Pat. No. 4,449,079 Ser. No. 367,951, filed Apr. 13, 1982 now U.S. Pat No. 4,528,485; Ser. No. 400,319 filed July 21, 1982; Ser. No. 191,056 filed Sept. 25, 1980, now U.S. Pat. No. 4,459,519; Ser. No. 141,268 filed Apr. 17, 1980 now U.S. Pat. No. 4,390,826 Ser. No. 077,784 filed Sept. 21, 1979 now U.S. Pat. No. 4,327,302 and Ser. No. 463,147 filed Feb. 2, 1983 which are hereby incorporated by reference.

Laundry machines as disclosed in the above patent applications are believed to have many significant advantages over the prior art laundry machines which employ various types of transmissions and mechanisms to convert rotary motion into oscillatory motion to selectively actuate the machine in its agitation washing mode and in its spin extraction mode. Such prior art laundry machines are believed to be more costly and more complicated to manufacture, consume more energy, and require more servicing. Laundry machines with electronically commutated motors require no mechanical means to convert unidirectional rotary motion into oscillatory action for washing agitation, and in some applications, it is believed that the spin basket may be directly driven by such a motor. While the past control systems, such as those disclosed in the aforementioned coassigned applications for instance, undoubtedly illustrated many features, it is believed that the control circuits for electronically commutated motors in general, and for such motors utilized in laundry machines, could be improved, as well as the methods of control utilized therein.

Coassigned U.S. Pat. No. 4,250,544, "Combination Microprocessor and Discrete Element Control System for a Clock Rate Controlled Electronically Commutated Motor" issued Feb. 10, 1981, to R. P. Alley discloses an arrangement for controlling an electronically commutated motor and is hereby incorporated by reference. Switching of the terminals of winding stages of an electronically commutated motor is accomplished by field effect transistors therein. While such circuitry is effective and satisfactory, it is desirable in some applications contemplated for the electronic commutated motors to switch relatively high voltages including voltages from generally about 100 volts, for example, up to about 400 volts or more to the winding stages. The terminals thus undergo relatively sudden high voltage excursions relative to the common, or ground connection of the electrical load powering apparatus. Such voltages are high enough to make the inherent or stray capacitances of circuits for controlling the switching an important consideration. Moreover, in such circuits for controlling the switching which have an active device such as a junction transistor or field effect transistor, such capacitances can be multiplied by the gain of the active device in an electronic effect sometimes known as the Miller effect. It is believed that when such higher voltages are used, or whenever the inherent capacitance is significant, the probability of false triggering, lack of reliable or positive switching, and even oscillation is increased.

SUMMARY OF THE INVENTION

Among the objects of the present invention are to provide improved electronic control circuits, improved electronically commutated motor systems and improved methods for controlling them, improved laundry apparatus, and improved methods for operating apparatus for switching high voltage DC and for controlling electrically load powering apparatus for achieving reliable switching of electrical power to an electrical load at relatively high voltages where inherent capacitance in circuits becomes an important consideration; to provide such improved circuits, systems, apparatus and methods which also provide protection from excessive load currents, short circuits, excessive circuit voltages, transients and other undesired conditions; to provide such improved circuits, systems, apparatus and methods which reliably switch electrical power to an electrical load in response to one or more simultaneously occurring digital signals or command pulses; and to provide such improved circuits, systems, apparatus and methods which are relatively uncomplicated and economical to manufacture in either discrete or integrated circuit form.

Other objects and features will be in part apparent and in part pointed out hereinafter.

In general and in one form of the invention, an electronic control circuit is provided for use in electrical load powering apparatus having a load connection, a high voltage supply connection and a common. The electrical load powering apparatus includes electronic means for switching the high voltage supply connection to the load connection, the electronic switching means having an input and being responsive to a control voltage difference between the input and the load connection, the load connection being subject to high voltage excursions relative to the common due to the switching. The electronic control circuit comprises active device circuit means for providing at least one pulse output relative to common and having at least one inherent capacitance and circuit means connected to the load connection for inverting the at least one pulse output of the active device circuit means to produce the control voltage difference between the electronic switching means input and the load connection. The electronic control circuit further includes means for charging the at least one inherent capacitance of the active device circuit means when one of the high voltage excursions occurs.

In general, and in a further form of the invention, an electronic control circuit is provided for use in electrical load powering apparatus having a load connection, high and low voltage supply connections, and a common. The electrical load powering apparatus includes electronic means for switching the high voltage supply connection to the load connection, the electronic switching means having an input and being responsive to a control voltage difference between the input and the load connection, the load connection being subject to high voltage excursions relative to the common due to the switching. The electronic control circuit comprises means including a circuit having an active device with at least one output relative to common responsive to successive input pulses, and an inverting circuit having at least one input, at least one output and first and second power leads and at least one diode. The at least one output of the active device circuit means is coupled to the at least one input of the inverting circuit, the at least one output of the inverting circuit is coupled to the electronic switching means input, and the first power lead is connected to the load connection. The at least one diode is connected between the at least one output of the active device circuit means and the load connection so as to hold the at least one input of said inverting circuit low when the at least one diode is forward-biased. The second power lead of the inverting circuit is coupled by another diode to the low voltage supply connection, and the inverting circuit means is able to store power for operation during the high voltage excursions.

Generally, and in an additional form of the invention, an electronic control circuit is provided for switching a DC supply to a load terminal in response to electrical pulses, the DC supply being returned to a common. The control circuit includes a field effect transistor (FET) having a first control lead connected to the load terminal, having a second control lead connected to the DC supply, and having a gate. The control circuit also includes means for coupling a potential difference to said gate, first and second inverting means each having an input and an output and first and second power leads, the first inverting means having an inherent capacitance, and a capacitor, and first, second and third diodes. The first diode connects the first power leads for both the first and second inverting means to a low voltage supply terminal. The input of the first inverting means is able to receive the electrical pulses and the first inverting means second power lead is resistively connected to the common. The output and second power lead of the second inverting means supply the potential difference and are respectively connected to the coupling means and the load terminal. The output of the first inverting means is coupled to the input of the second inverting means. The capacitor is connected between the first and second power leads of the second inverting means, and the second and third diodes are connected from the first inverter means output to the second inverter means first and second power leads respectively.

Generally, and in still another form of the invention, an electronic control circuit is provided for positively switching electronic switch means for connecting a source of relatively high voltage to an electrical load. The electronic control circuit includes a semiconductor circuit having an input for receiving a command pulse at a relatively low voltage level, the semiconductor circuit having an output and having an inherent capacitance at the output and further includes an inverting circuit having an input, an output, and first and second power leads. The output of the semiconductor circuit is connected to the input of the inverting circuit. The input and the first power lead of the inverting circuit are connected by a first resistance, said first and second power leads are connected by a capacitor, the first power lead is connected by a first diode to a low voltage power supply terminal, and the output of the inverting circuit and the second power lead comprise output connections to the electronic switch means. A second diode is connected between the output of the semiconductor circuit and the second power lead of the inverting circuit, the second diode means being oriented to charge the inherent capacitance of said semiconductor circuit during the switching.

Generally, and in a still further form of the invention, an electronically commutated motor system has an electronically commutated motor including a stationary assembly having a plurality of winding stages adapted to be selectively commutated, and rotatable means associated with the stationary assembly in selective magnetic coupling relation with the winding stages, first and second conductors for supplying power, the second conductor constituting a common, and control units for commutating the winding stages by selectively switching the winding stages at respective terminals thereof to the first and second conductors in response to command pulses. Each of the control units includes electronic means for switching a respective terminal to the first conductor, the electronic switching means having an input and being responsive to a control voltage difference between the input and the respective terminal, the respective terminal being subject to high voltage excursions relative to the common due to the switching. Each of the control units also includes active device circuit means for providing at least one pulse output relative to common in response to at least some of the command pulses and having at least one inherent capacitance, and circuit means connected to the respective terminal for inverting the at least one pulse output of the active device circuit means to produce the control voltage difference between the electronic switching means input and said respective terminal. Each of the control units further includes means for charging the at least one inherent capacitance of the active device circuit means when one of the high voltage excursions occurs.

In general, and in yet another form of the invention, laundry apparatus includes means operable generally in a washing or other laundering mode for agitating water or other fluid and fabrics to be laundered therein and operable generally in a spin mode for thereafter spinning the fabrics effect centrifugal displacement of water or other fluid from the fabrics and an electronically commutated motor including a stationary assembly having a plurality of winding stages adapted to be selectively commutated, and rotatable means associated with said stationary assembly in selective magnetic coupling relation with the winding stages for driving, said agitating and spinning means in the washing laundering mode opertion and in the spin mode operation thereof upon the commutation of the winding stages. The laundry apparatus also includes first and second conductors for supplying power, the second conductor constituting a common, and control units for commutating the winding stages by selectively switching the winding stages at respective terminals thereof to said first and second conductors in response to command pulses. Each of the control units includes electronic means for switching a respective terminal to the first conductor, the electronic switching means having an input and being responsive to a control voltage difference between the input and the respective terminal, the respective terminal being subject to high voltage excursions relative to the common due to the switching. Each of the control units further includes active device circuit means for providing at least one pulse output relative to common in response to at least some of the command pulses and having at least one inherent capacitance, circuit means connected to the respective terminal for inverting the at least one pulse output of the active device circuit means to produce the control voltage difference between the electronic switching means input and the respective terminal, and means for charging the at least one inherent capacitance of the active device circuit means when one of the high voltage excursions occurs.

Generally, a method form of the invention involves a method of operating apparatus for switching high voltage (HV) direct current (DC) of a source thereof, the apparatus including electronic switch means having an input lead and first and second control leads with the first control lead being connected to the HV source and the HV source being returned to a common and with the HV electronic switch means adapted to change the voltage at the second control lead suddenly to essentially the HV upon the occurrence of a potential difference between the input and the second control lead. The method includes the steps of providing an electrical pulse relative to the common, the electrical pulse having a duration, and level-shifting and inverting the electrical pulse away from the common to provide the potential difference relative to the second control lead. A voltage is derived from the second control lead voltage when it is changing to the high voltage. The derived voltage is substituted for the electrical pulse, and the derived voltage is inverted and applied as the potential difference between the input and the second control lead of the electronic switch means.

In general, another method form of the invention involves a method for controlling an electronically commutated motor system having an electronically commutated motor including a stationary assembly having a plurality of winding stages adapted to be selectively commutated, and rotatable means associated with the stationary assembly in selective magnetic coupling relation with the winding stages, and means for supplying a high voltage relative to a common and electronic means for switching the high voltage to at least one of the winding stages at a load connection therewith, the electronic switching means having an input and being responsive to a control voltage difference between the input and the load connection, the load connection being subject to high voltage excursions relative to common due to the switching. The method includes the steps of producing at least one electrical pulse relative to common from a circuit having at least one inherent capacitance, level-shifting and inverting the at least one electrical pulse to produce the control voltage difference between the electronic switching means input and the load connection, and charging the at least one inherent capacitance when one of the high voltage excursions occurs.

In general, a further method form of the invention involves a method for controlling an electronically commutated motor system having an electronically computated motor including a stationary assembly having a plurality of winding stages adapted to be selectively commutated, and rotatable means associated with the stationary assembly in selective magnetic coupling relation with the winding stages, first and second conductors for supplying power, said second conductor constituting a common, and control units for commutating the winding stages and causing a current to flow in the motor by selectively switching the winding stages at respective terminals thereof to the first and second conductors in response to command pulses, each of the control units including electronic means for switching a respective terminal to the first conductor, the electronic switching means having an input and being responsive to a control voltage difference between the input and said respective terminal, the respective terminal being subject to high voltage excursions relative to said common due to the switching. The method includes performing in each of the control units the steps of providing in response to at least one of the command pulses at least one electrical pulse relative to common from a circuit having at least one inherent capacitance, level-shifting and inverting the at least one electrical pulse to produce the control voltage difference between the electronic switching means input and the respective terminal, charging the at least one inherent capacitance when one of the high voltage excursions occurs, sensing the motor current and, upon the current exceeding a predetermined level, inhibiting the electrical pulse providing step.

In general, and in a further additional form of the invention, an electronic control circuit for connection by first and second conductors to means for supplying a rectified A.C. voltage, includes first and second capacitors connected to each other at a node and connected in series across the first and second conductors and means for utilizing electrical energy having first and second terminals, the first terminal being connected to the first and second capacitors at the first node. The electronic control circuit further includes a control unit for alternately switching the second terminal of the electrical energy utilization means to the first and second conductors in response to command pulses. The control unit has electronic means for switching the second terminal to the first conductor, the electronic switching means having an input and being responsive to a control voltage difference between the input and the second terminal, the second terminal being subject to high voltage excursions relative to the second conductor due to the switching, and active device circuit means for providing at least one pulse output relative to the second conductor in response to at least some of the command pulses and having at least one inherent capacitance. The control unit also has circuit means connected to the second terminal for inverting the at least one pulse output of the active device circuit means to produce the control voltage difference between the electronic switching means input and the second terminal, and means for charging the at least one inherent capacitance of the active device circuit means when one of the high voltage excursions occurs.

BRIEF DESCRIPTION OF THE DRAWINGS

FIG. 1 is a block diagram of apparatus for switching high voltage (HV) direct current to an electronically commutated motor of the present invention including three control units according to the invention;

FIGS. 3, 4, and 5 are a set of voltage-versus-time diagrams of waveforms illustrating the operations of a control unit of FIG. 2 according to a method of the invention;

Corresponding reference characters indicate corresponding parts throughout the several views of the drawings.

Figure 2:
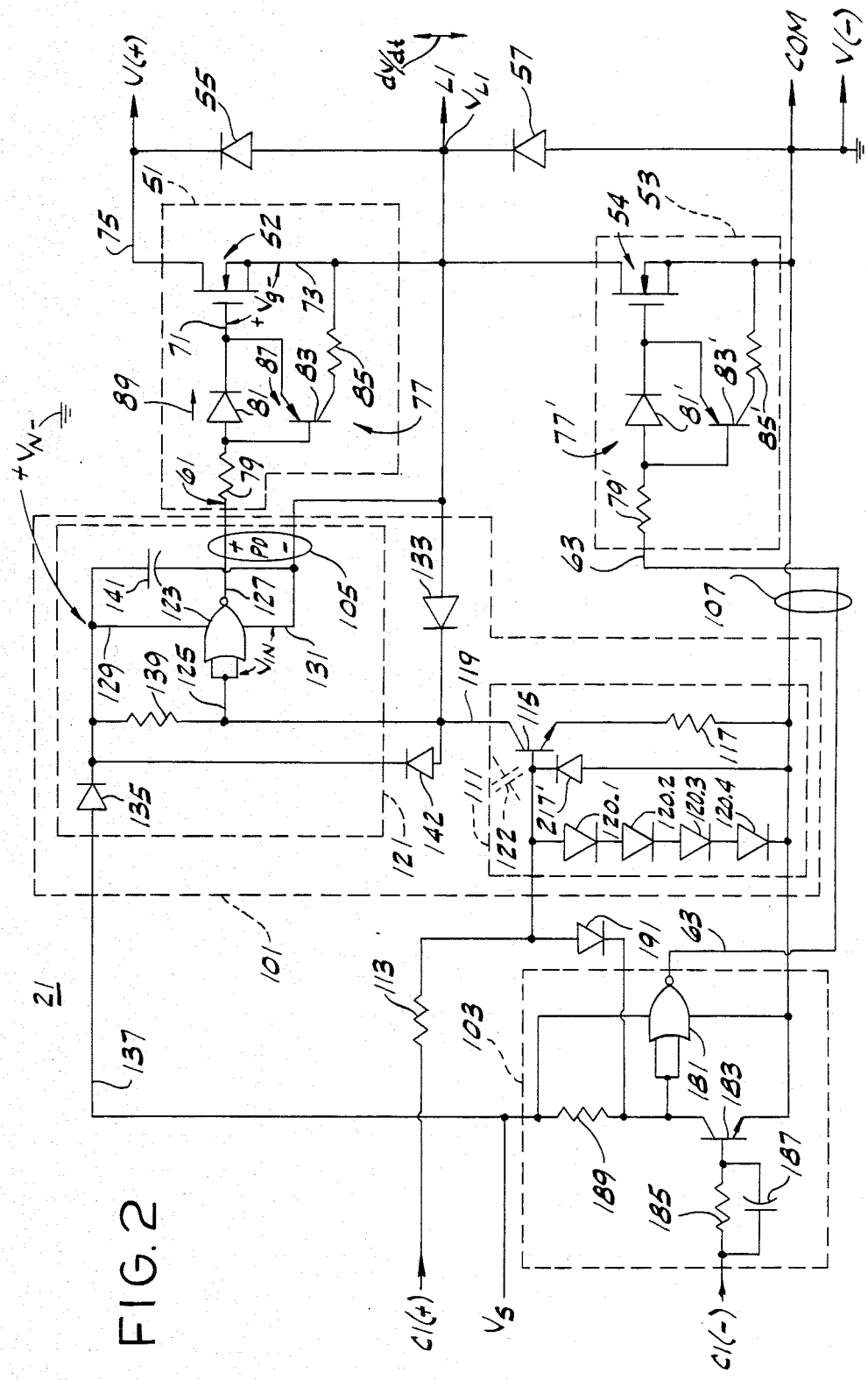
FIG. 2 is a schematic diagram of one of the control units of FIG. 1.

The exemplifications set out herein illustrate preferred embodiments of the invention in one form thereof, and such exemplifications are not to be construed as limiting the scope of the invention in any manner.

DETAILED DESCRIPTION OF PREFERRED EMBODIMENTS

Referring now to the drawings, and more particularly to FIG. 1, electronically commutated motor system 1 has an electronically commutated motor (ECM) M. The ECM is adapted to be powered from an electrical load powering apparatus 10 which in turn is energized by a high voltage (HV) direct current (DC) power source or supply 11 having a high voltage positive conductor 13 and a negative conductor 15. Electrical load powering apparatus 10 has control units 21, 23, and 25 equal in number to three winding stages S1, S2, and S3 of motor M. DC power supply 11 provides a voltage having a magnitude in excess of about 100 volts, being illustratively 400 volts DC or more. Each control unit 21, 23, and 25 has a load connection L1, L2, or L3 which is connected to a respective terminal T1, T2, and T3 of the winding stages S1, S2, and S3. Each unit 21, 23, and 25 has a high voltage supply connection V(+) and a negative return V(−) connected to correspondingly marked positive and negative terminals 13 and 15 of the high voltage DC power supply 11. Each unit is also connected at a low voltage terminal $V_S$ and a circuit common COM to a low voltage power source 31. Each unit 21, 23, and 25 also has first and second company signal inputs C1(+),C1(−); C2(+), C2(−); and C3(+),C3(−). For instance in control unit 21, a command signal High at input C1(+) commands switching of the high voltage positive terminal V(+) to load terminal L1 connected to terminal T1 of winding stage S1. When command signal input C1(+) is low and command signal input C1(−) is high, the negative return terminal V(−) is switched to load terminal L1. In control unit 23, command signal inputs C2(+) and C2(−) respectively command switching of the high voltage positive terminal V(+) and the negative return V(−) to terminal T2 of winding stage S2. In control unit 25, command signal inputs C3(+) and C3(−) respectively command switching of the high voltage positive terminal V(+) and the negative return V(−) to terminal T3 of winding stage S3. The negative return V(−) is connected to circuit common COM for each unit 21, 23, and 25 either directly as in FIG. 2 or through a current shunt resistor $R_S'$ as in FIG. 6. In either case the negative conductor 13 is regarded as constituting a common for the present purposes.

ECM M has a rotatable assembly, or rotor, (not shown) and a stationary assembly including a stator including the three winding stages S1, S2, and S3. Winding stages S1, S2 and S3 are adapted to be electronically commutated in at least one preselected sequence to accomplish rotation of the rotatable assembly. The winding stages are powered or commutated in each such preselected sequence by operation of the control units 21, 23, and 25 so that one of the winding stage terminals (e.g. T1) is selectively switched to positive conductor 13 and another of the winding stages terminals (e.g. T2) is switched to negative conductor 15. As a result, a current (e.g. I1) flows in two of the winding stages leaving the third unpowered at any one time. The winding stage terminals are switched in one preselected sequence so that currents I1, I2, I3, I4, I5, I6 flow in that order and then repeat, causing rotation of the rotatable means in one direction.

When the winding stage terminals are switched in a second preselected sequence so that the currents flow in the reverse order I6, I5, I4, I3, I2, I1 and then repeat, rotation of the rotatable means in the opposite direction is accomplished. The command signals to inputs C1(+),C1(−), C2(+), C2(−), C3(+), and C3(−) are provided to the units 21, 23 and 25 from an external source of command signals, not shown, so as to cause the winding stages to be commutated in the just described way.

When the winding stages S1, S2, and S3 are energized or powered in a temporal sequence, three sets of eight magnetic poles are established that provide a radial magnetic field that moves clockwise or counterclockwise around the bore of the stationary assembly depending on the preselected sequence or order in which the stages are powered. This moving field intersects with the flux field of the permanent magnet rotor to cause the rotor to rotate relative to the stationary assembly in a desired direction to develop a torque which is a direct function of the intensities or strengths of the magnetic fields. If a more detailed description of the construction of electronically commutated motor M is desired, reference may be had to the aforementioned application Ser. No. 367,951 filed Apr. 13, 1982 to John H. Boyd, Jr., which incorporated herein by reference.

ECM M thus constitutes an electronically commutated motor including a stationary assembly having a plurality of winding stages adapted to be selectively commutated, and rotatable means associated with the stationary assembly in selective magnetic coupling relation with the winding stages. Further, while electronically commutated motor M is discussed as shown herein for purposes of disclosure, it is contemplated that other such motors of different constructions, having 2, 4, 6, etc. poles and having 2, 3, 4 or more winding stages and/or different winding arrangements may be utilized in one or another form of the invention so as to meet at least some of the objects thereof.

The winding stages of motor M as explained for instance in the aforementioned Alley U.S. Pat. No. 4,250,544 are commutated without brushes by sensing the rotational position of the rotatable assembly or rotor as it rotates within the bore of the stationary assembly and utilizing electrical signals generated as a function of the rotational position of the rotor to sequentially apply a high voltage DC voltage to each of the winding stages in different preselected orders or sequences that determine the direction of the rotation of the rotor. Position sensing may be accomplished by a position detecting circuit responsive to the back emf of the ECM M to provide a simulated signal indicative of the rotational position of the ECM rotor to control the timed sequential application of voltage to the winding stages of the motor.

The command signals are supplied as relatively low voltage nominally 9 volt pulses to inputs C1(+), C1(−), C2(+), C2(−), C3(+), and C3(−). The pulses can be pulse width modulated (PWMed) at rates up to and exceeding 20 KHz. for motor speed and torque control and for other purposes.

In FIG. 1, a laundry apparatus indicated generally at 41 includes the electronically controlled motor system 1 and also has a basket 43 and a coaxially mounted agitator 45. Basket 43 is rotatable within a tub (not shown) which holds the water for washing the fabrics to be laundered. Basket 43 and the agitator 45 are rotatable independently or jointly about their common axis. Basket 43 and agitator 45 together comprise means operable generally in a washing mode for agitating water and fabrics to be laundered therein and operable generally in a spin mode for thereafter spinning the fabrics to effect centrifugal displacement of water from the fabrics. However, it is contemplated that such means may also include only a basket which is mounted on a horizontal or inclined axis. Then there is no separate finned agitator and the basket is operated in an oscillatory mode to agitate the wash water and fabrics to launder them. Upon the commutation of the winding stages, the rotatable assembly of motor M drives the agitating and spinning means and is coupled selectively to the agitator alone during the washing mode operation and to both the basket and the agitator in the spin mode operation through a connection mechanism 47. Connection mechanism 47 suitably comprises a fixed ratio speed reducer, such as a gear box or a pulley arrangment, for instance.

Alternatively in some applications, it is believed that the motor M may be directly coupled to the agitator and the basket. The rotatable assembly of motor M and any such fixed ratio speed reducer constitute means for driving the agitating and spinning means in the washing mode operation and in the spin mode operation thereof upon the commutation of the winding stages.

Electrical load powering apparatus 10, when used for energizing the ECM in the above-described way, constitutes means for commutating the winding stages by selectively supplying or switching power thereto in response to a pattern of control signals or command pulses, leaving at least one of the winding stages unpowered at any one time while the other winding stages are powered. Apparatus 10 also constitutes means for controlling the application of DC voltage to the winding stages to provide a resultant effective voltage thereto.

FIG. 2 shows a schematic diagram for control unit 21, it being understood that control units 23 and 25 are identical to control unit 21. Control unit 21 has a first electronic switching circuit 51 including a high voltage field effect transistor (FET) 52 for electronically switching the high voltage supply connection V(+) to the load connection L1 when command signal input C1(+) is high, and a second electronic switching circuit 53 including a FET 54 for switching the negative return V(−) to the load connection L1 when command signal C1(−) is high. It is to be understood that FETs 52 and 54 are merely illustrative of high voltage electronic switching means, and insulated gate rectifiers (IGRs) and other devices are also contemplated in accomplishing at least some of the objects of the invention. Freewheeling diodes 55 and 57 are wired across the FETs 52 and 54 to limit switching transients. Electronic switching circuit 51 has an input 61 and is responsive to a potential difference PD, herein also called a control voltage difference, between input 61 and load connection L1. Electronic switching circuit 53 has an input 63 and is responsive to a voltage difference between input 63 and common COM. It is evident that the load connection L1 and winding stage terminal T1 are subject to high voltage excursions relative to common COM due to switching. Electronic switching circuits 51 and 53 have the FETs 52 and 54 in series, and have a series junction connected at load terminal L1. FETs 52 and 54 are connected exteriorly to the positive and negative conductors 13 and 15 of the high voltage power source 11.

In electronic switching circuit 51, FET 52 has a gate 71 and source and drain leads 73 and 75 as control leads respectively connected to terminal T1 of the motor M as a load and to terminal V(+). FET 52 constitutes electronic switch means for connecting a source of relatively high voltage (e.g., supply 11) to an electric motor winding (e.g., winding stage S1), and gate 71 constitutes an electronic switching means input. The turn-on and turn-off characteristics of FETs 52 and 54 are separately programmable by respective identical coupling circuits 77 and 77′. For brevity, only coupling circuit 77 is discussed, it being understood that corresponding components in coupling circuit 77′ are primed. Each coupling circuit such as 77 constitutes means for coupling a potential difference such as control voltage difference PD to the gate of a respective FET 52 or 54. When control voltage difference PD goes high, the gate capacitance of FET 52 is charged through a resistor 79 and a diode 81 of circuit 77, so that selection of the value of resistor 79 programs the time constant or turn-on characteristic of FET 52. When the control voltage difference PD goes low, diode 81 becomes back biased and a transistor 83 turns on, discharging the inherent gate capacitance of FET 52 into resistor 85. Selection of the value of resistor 85 programs the time constant of FET 52 for its turn-off characteristic. Thus, it is seen that resistors 79 and 85 constitute current limiting means or means for establishing first and second time constants for FET 52. In addition, transistor 83 and resistor 85 provide means for effectively "short circuiting" the very high impedance gate 71 to the source 52 of FET 52 when FET 52 is to be kept off, while still providing a controlled turn-on. This is advantageous in motor control applications, for instance, where stray electrical noise could otherwise be coupled to the FETs 52 and 54 when they are supposed to be turned off.

In coupling circuit 77, resistor 79 and diode 81 are connected in series from input 61 to the gate 71 of FET 52. Resistor 85 is connected between load terminal L1 and the collector of PNP transistor 83. The base and emitter of transistor 83 are connected in parallel to diode 81 in an easy-current direction 87 opposite to the easy-current direction 89 of diode 81. The base of transistor 83 is connected to resistor 79 and diode 81. The emitter of transistor 83 is connected to gate 71 of FET 52, and the collector of transistor 83 is resistively connected to source 73 of the FET 52 and terminal L1. In this way the emitter of transistor 83 constitutes a gating output point to FET 52 relative to terminal L1, and the emitter of transistor 83' in coupling circuit 77' constitutes a gating output point to FET 54 relative to common COM.

Control unit 21 includes an electronic control circuit 101 for controlling electronic switching circuit 51 having command signal input C1(+). Control unit 21 also includes an additional circuit including electronic switching circuit 53 and an input circuit 103 having command signal input C1(−). Together, circuits 53 and 103 constitute an additional circuit having the electronic switching circuit 53 for switching winding stage terminal T1 to common in response to at least some of the command pulses at input C1(−). Electronic control circuit 101 and input circuit 103 respectively feed the coupling circuits 77 and 77' at outputs 105 and 107.

Electronic control circuit 101 has a transistor, or semiconductor, circuit 111 which receives a command signal from input C1(+) through resistor 113. When the command signal goes high, NPN transistor 115 conducts through emitter resistor 117. Four serially connected diodes 120.1, 120.2, 120.3, and 120.4 are connected from transistor 115 base to common COM. The clamping action of diodes 120.1-.4 causes transistor 115 to function as a regulated current source as seen on line 119. Transistor circuit 111 constitutes active device circuit means for providing at least one pulse output relative to common responsive to the command signal, or successive pulses at input C1(+), and having at least one inherent capacitance.

Transistor circuit 111 feeds an inverting circuit 121 in electronic control circuit 101. Inverting circuit 121 level-shifts the information in the command signal at input C1(+) from common COM to load terminal L1, which undergoes the high voltage excursions. Inverting circuit 121 constitutes circuit means connected to the load connection L1 for inverting the at least one pulse output of the active device circuit means (e.g., transistor circuit 111) to produce the control voltage difference PD between the electronic switching means input 61 and the load connection L1.

When input C1(+) is at zero volts, transistor 115 is off, and an input high from relatively low voltage $V_s$ is fed to input 125 of inverting logic circuit 123 through resistor 139. When a 9 volt command pulse appears at input C1(+), resistor 113 and diodes 120.1, 120.2, 120.3, 120.4 drop the voltage to about 2.8 volts at transistor 115 base. The transistor 115 conducts a collector current, set by emitter resistor 117, sufficient to cause a voltage drop in resistor 139 to bring input 125 low relative to negative power lead 131. Control voltage difference PD goes high and turns on electronic switching circuit 51. The voltage $V_{L1}$ at load connection L1 suddenly rises to hundreds of volts of HV.

An inherent capacitance 122 of transistor 115 at output line 119 (sometimes called the Miller effect capacitance) is initially at a low voltage compared to the hundreds of volts of HV. Inverting circuit 121 is connected to the load connection L1 and thus is tied at least approximately in voltage thereto. Consequently, high voltage differences will appear between transistor 115 and circuit 121 if the inherent capacitance 122 cannot be swiftly charged somehow, and high charging current will flow into inherent capacitance 122 if it is swiftly charged Conversely, when FET 52 turns off and load terminal L1 could fall through hundreds of volts, the inherent capacitance 122 is at first charged to hundreds of volts. Inverting circuit 121 could fall through hundreds of volts. Consequently, high voltage differences will again appear between transistor 115 and circuit 121 if the inherent capacitance 122 cannot be swiftly discharged somehow, and high discharging current will flow from inherent capacitance 122 if it is swiftly discharged.

In the present circuitry such high voltages and currents are advantageously either prevented from occurring, or prevented from causing false triggering, oscillation, and other undesirable interactions. The present circuitry avoids the potential difficulties and positively switches or latches FET 52 on for the duration of a voltage rise dV/dt as FET 52 is turned on, and positively switches the drive of FET 52 off when the voltage at load terminal L1 falls.

Circuit 121 has a complementary metal oxide semiconductor (CMOS) inverting logic gate 123 wired as an inverter with a single input 125 and a output 127. Inverting logic gate 123 has positive and negative power leads 129 and 131. Output 127 and negative power lead 131 comprise output connections to the electronic switching circuit 51. The collector of transistor 115 is connected by line 119 to the input 125 of inverting logic gate 123, and the output 127 thereof is connected to and drives or feeds input 61 of coupling circuit 77 for the gate 71 of FET 52. The source control lead 73 of FET 52 and load terminal L1 at the series junction of FETS 52 and 54 are connected to negative power lead 131. A diode 133 has its cathode connected to both the inverter input 125 and the transistor circuit 111 output at line 119 and has its anode connected to negative power lead 131 and load connection L1. Diode 133 accomplishes advantageous voltage deriving and substituting functions as described in more detail hereinafter. Diode 133 constitutes means for charging the at least one inherent capacitance 122 of the active device circuit means (e.g., transistor circuit 111) when one of the high voltage excursions occurs during the switching. Diode 133 is connected between the at least one output of the active device circuit means and the load connection L1 so as to hold the at least one input 125 of the inverting logic gate 123 low when diode 133 is forward-biased. In this way, diode 133 prevents large voltage differences between transistor 115 and circuit 121 from occurring when voltage $V_{L1}$ suddenly rises.

A diode 135 is connected to positive power lead 129 from low voltage power source 31 of FIG. 1 so that low voltage $V_S$ powers inverting logic gate 123 when the voltage on load terminal L1 is near common COM. Diode 135 is thus connected in easy-current direction so as to permit power to be transferable from a low voltage terminal connection or line 137 to inverting logic gate 123. Diode 135 is also connected in series with a resistor 139 to the input of inverting logic gate 123, and to line 119 for completing the collector circuit for transistor 115 in transistor circuit 111. Resistor 139 is thus connected between input 125 and positive power lead 129 of gate 123. The positive power lead 129 of gate 123 is connected to the cathode of diode 135 opposite to the anode connection of diode 135 to the low voltage $V_s$ terminal 137. A capacitor 141 is connected between the positive and negative power leads 129 and 131 of inverting logic gate 123. Capacitor 141 constitutes means for temporarily maintaining power on inverting logic gate 123 during high voltage excursions of load terminal L1. In this way, inverting circuit 121 is able to store power for operation during the high voltage excursions. Diode 135 is also connected to capacitor 141 and constitutes means for coupling the relatively low voltage $V_s$ to inverting logic gate 123 and to capacitor 141 when one of the high voltage excursions has ceased and for isolating circuit 121 including capacitor 141 from the low voltage $V_s$ during the high voltage excursions.

Another diode 142, connected between the output line 119 of transistor circuit 111 and the positive power lead 129 of inverter 123, acts as a protective device for input 125 by preventing input 125 from rising in voltage more than one diode drop above the voltage of capacitor 141. Diode 142 and capacitor 141 are connected in series from load connection L1 to inverter input 125. Together diode 142 and capacitor 141 constitute means for discharging the at least one inherent capacitance 122 of the active device circuit means (e.g., transistor circuit 111) when one of the high voltage excursions ceases. In this way diode 142 prevents large voltage differences between transistor 115 and circuit 121 from occurring when voltage $V_{L1}$ suddenly falls.

Diode 133 is connected between the collector of transistor 115 and the negative power lead 131 of inverting logic gate 123 so as to provide an easy-current direction relative to resistor 139 opposite to the easy-current direction of diode 135 relative to resistor 139. It is to be noted that the skilled worker in other embodiments can implement the circuitry of FIG. 2 with all polarities of voltages and components reversed (e.g. reverse V(+) and V(−) connections, make $V_S$ a negative low supply voltage, reverse all diode connections and substitute NPN for PNP transistors and PNP for NPN transistors). In such other embodiments the respective easy-current directions of diode 133 and diode 135 remain opposite relative to resistor 139. When diode 133 is wired in such manner the switching of FETs 52 and 54 responds smoothly to command signal inputs C1(+) and C1(−) even when the voltage on each winding stage such as S1 is rising to and falling from a high voltage substantially in excess of the voltage $V_S$ of the low voltage power source 31.

It is noted that the electronic control circuit 101 can also be regarded as having first and second inverting circuits. The first inverting circuit has an inherent capacitance 122 and includes transistor 115 and resistors 113, 117 and 139. The first inverting circuit has an input C1(+), an output on line 119, a first power lead connecting resistor 139 to diode 135 and a second power lead connecting the emitter of transistor 115 to resistor 117. The second inverting circuit is inverting logic gate 123 with its input 125, output 127 and first and second power leads 129 and 131. First, second and third diodes 135, 142 and 133 and capacitor 141 are interconnected with the first and second inverting circuits to provide stability during the high voltage excursions. Diode 135 connects the first power leads for both the first and second inverting circuits to a low voltage supply terminal (e.g., line 137). The input C1(+) of the first inverting circuit is able to receive electrical command pulses. The second power lead (e.g., transistor 115 emitter lead) is resistively connected to common. The output 127 and second power lead 131 of the second inverting circuit 123 supply potential differences PD and are respectively connected to coupling circuit 77 and load terminal L1. The output line 119 of the first inverting circuit is coupled to input 125 of the second inverting circuit either by direct connection as shown in FIG. 2 or by a coupling network as in FIG. 6. Capacitor 141 is connected between first and second power leads 129 and 131 of the second inverting circuit 123. The diodes 142 and 133 are connected from output line 119 of the first inverting circuit to the first and second power leads 129 and 131 respectively of the second inverting circuit 123.

In a method utilized in the control unit 21 of FIG. 2, circuit 121 level-shifts and inverts any pulse on line 119 away from common COM so as to provide potential difference PD to FET 52 in electronic switching circuit. FET 52 is, of course, a device adapted to change the voltage at control lead 73 suddenly to essentially the HV upon the occurrence of potential difference PD between input 61 and the control lead 73. By virtue of the inherent capacitance of transistor 115 and the presence of diode 133, a voltage is derived across diode 133 from the voltage at control lead 73 and load terminal L1 when the voltage thereat is changing to the high voltage. Because diode 133 is also wired between input 125 and negative power lead 131 of inverting logic gate 123, the derived voltage equal to one diode drop is substituted for the pulse on line 119 produced by transistor circuit 111. The substitution is performed during the duration of the pulse on line 119. Inverting logic gate 123 inverts the derived voltage and applies the inverted derived voltage at output 127 as the potential difference PD between input 61 and control lead 73 of electronic switching circuit 51.

In FIG. 3, command pulses at input C1(+) successively occur. The control unit 21 of FIG. 2 advantageously operates so that pulses of potential difference PD which are essentially the same shape as the command pulses are produced at the output 127 of inverter 123. A gate voltage $V_g$ across FET 52 smoothly and positively responds to the command pulses at input C1(+). It is noted that the pulses of gate voltage $V_g$ in FIG. 3 have a leading edge 151 and a trailing edge 153 exhibiting time constants which are programmed by resistors 79 and 85 respectively in the coupling circuit 77.

FIG. 4 shows load terminal voltage pulses $V_{L1}$ occurring as high voltage excursions from zero volts to 400 volts at supply terminal V(+). Voltage pulses $V_{L1}$ are essentially synchronized with the command pulses of FIG. 3 because of electronic control circuit 101. Superimposed on FIG. 4 in dashed lines is the voltage $V_N$ of the positive power lead 129 of inverting logic gate 123 relative to common COM. When the voltage $V_{L1}$ is at zero volts, inverting logic gate 123 is supplied with voltage $V_S$ as shown in FIG. 4. Then when voltage $V_{L1}$ suddenly rises to the voltage at V(+), the voltage $V_N$ rises with voltage $V_{L1}$ because the negative power lead 131 of gate 123 is tied to load connection L1. Since capacitor 141 continues to power gate 123 with voltage $V_S$, voltage $V_N$ exceeds voltage $V_{L1}$. Some decrease 155 occurs in voltage $V_N$, however, as inverting logic gate 123 and transistor 115 draw current from capacitor 141. Capacitor 141 is selected large enough in value to effectively power gate 123 for at least the duration t of a command pulse at input C1(+). In an ECM system such as in FIG. 1, FETs 52 and 54 are both off in control unit 21 at predetermined times in the commutation sequence when control units 23 and 25 are powering winding stages S2 and S3. At these times, voltage $V_{L1}$ varies in a complex manner (not shown in FIG. 4) during parts of the interval 157 between pulses of $V_{L1}$. Accordingly, diode 135 is not necessarily conducting during the entire interval 157. The control units 21, 23 and 25 operate advantageously even under these more complex circumstances because the time needed to recharge capacitor 141 is relatively short.

In FIG. 5, the input voltage $V_{in}$ for inverting logic gate 123 is shown. Voltage $V_{in}$ is initially equal to voltage $V_S$ when input C1(+) is low. This is because transistor 115 is off, and there is negligible voltage drop across resistor 139 of FIG. 2. Diode 133 is nonconducting at this time. Resistor 139 and capacitor 141 establish a voltage relationship between input 125 and negative power lead 131 regardless of voltage $V_{L1}$ when diode 133 is not conducting. With input voltage $V_{in}$ high, inverting logic gate 123 produces an output Low for potential difference PD, keeping FET 52 off through coupling circuit 77.

When input C1(+) goes high, transistor 115 turns on, and transistor circuit 111 becomes a current source on line 119. Current flows down through resistor 139, causing the voltage on input 125 to fall and causing a transition 161 in voltage $V_{in}$ as shown in FIG. 5. Inverting logic gate 123 sees an input low and produces an output High for potential difference PD, turning FET 52 on through coupling circuit 77. FET 52 switches load terminal L1 to HV DC terminal V(+), causing voltage $V_{L1}$ to quickly rise. Current from terminal L1 flows through diode 133 into the inherent capacitance 122 of transistor circuit 111. Because diode 133 is a nonlinear device it limits the voltage drop across the input 125 of gate 123 to about −0.7 volts as shown in FIG. 5, instead of permitting $V_{in}$ to continue to decrease in the direction of the dashed line 163. With load terminal L1 at the DC voltage of V(+) and with transistor circuit 111 on, input voltage $V_{in}$ remains at about −0.7 volts in segment 165. In this way the −0.7 voltage drop across diode 133 constitutes a voltage derived from the load terminal voltage $V_{L1}$ when voltage $V_{L1}$ is changing to a high voltage value. The derived voltage is substituted across the input of inverting logic circuit 123 in place of the voltage corresponding to dashed line 163, whereupon the derived voltage 165 is inverted and applied to FET 52.

When the command pulse at input C1(+) goes back low, transistor 115 is turned off. The voltage drop across resistor 139, which resulted from transistor 115 acting as a current source. ceases, and the voltage $V_{in}$ between input 125 and lead 131 of gate 123 rises at transition 167 while voltage $V_{L1}$ is still at the HV. Diode 133 becomes reverse-biased again. Inverting logic gate 123 inverts the positive input voltage $V_{in}$, produces an output Low for potential difference PD, and turns FET 52 off through coupling circuit 77.

When FET 52 is turned off, load terminal voltage $V_{L1}$ rapidly falls with a large negative dV/dt rate of change of voltage. The collector voltage of transistor 115 on line 119 briefly remains at a high voltage because its inherent capacitance 122 is still charged. This high voltage keeps the input voltage of gate 123 high, forcing or latching its output potential difference low and keeping FET 52 advantageously off as terminal L1 drops in voltage. Diode 142 bypasses resistor 139 and provides a relatively direct path for discharge of the inherent capacitance 122 of transistor 115 into capacitor 141. The action of diode 142 avoids excessive positive voltage, indicated by dashed line 169, from appearing across the input 125 of gate 123. Input voltage $V_{in}$ becomes equal to $V_S$ once again at segment 171 of FIG. 5.

The inherent capacitance 122 of transistor circuit 111 tends to keep the voltage on line 119 low as terminal voltage $V_{L1}$ rises, and high as $V_{L1}$ falls. If circuit 121 of FIG. 2 were noninverting in operation when $V_{L1}$ rises, FET 52 would be turned off. Then $V_{L1}$ would fall, providing a high on line 119, and FET 52 would be turned on, resulting in a cycle of instability and possibly oscillation. However, in the preferred embodiments a circuit portion exemplified by the FIG. 2 circuit 121 is selected from a class of circuits operating in an inverting manner. Examples of such circuits are the inverter (single input), the NOR gate with 2 or more inputs, the NAND gate with 2 or more inputs, and other inverting circuits which can have multiple inputs and outputs.

Referring again to FIG. 2, second input circuit 103 receives a command signal at input C1(−) and produces the second output potential difference 107 between input 63 of coupling circuit 77' and common COM. Second input circuit 103 has an inverter 181 preceded by a common emitter inverting amplifier having transistor 183, base resistor 185 and speed up capacitor 187 connected to input C1(−). Resistor 189 provides supply current from voltage $V_S$ to the collector of transistor 183.

A diode 191 performs a protective function if Highs occur simultaneously in command signals at inputs C1(+) and C1(−), a condition which could turn on both FETs 52 and 54 and short the high voltage DC power supply 11. When input C1(−) goes high, transistor 183 conducts. If input C1(+) then becomes high, diode 191 conducts current from resistor 113 to the collector of transistor 183. With diode 191 conducting, the base of transistor 115 is kept low and transistor 115 is prevented from turning on. If transistor 115 is already on because of a preexisting High at input C1(+), the conducting diode 191 brings the base of transistor 115 low and turns transistor 115 off. In this way FET 52 is prevented from being switched on, or from remaining switched on, when input C1(−) is high. Diode 191 thus constitutes means for selectively disabling transistor circuit 111 from providing a pulse output on line 119. Diode 191 is associated with circuits 103 and 53 and also constitutes means for preventing or inhibiting the active device circuit means (e.g., transistor circuit 111) from responding to any of the command pulses at input C1(+) when one of the command pulses at input CI(−) is present and thus from providing electrical pulses on output line 119.

Transistor 183 has an inherent capacitance, but because common COM experiences no high voltage excursions as load terminal L1 does, such capacitance is not a significant consideration.

Figure 6:
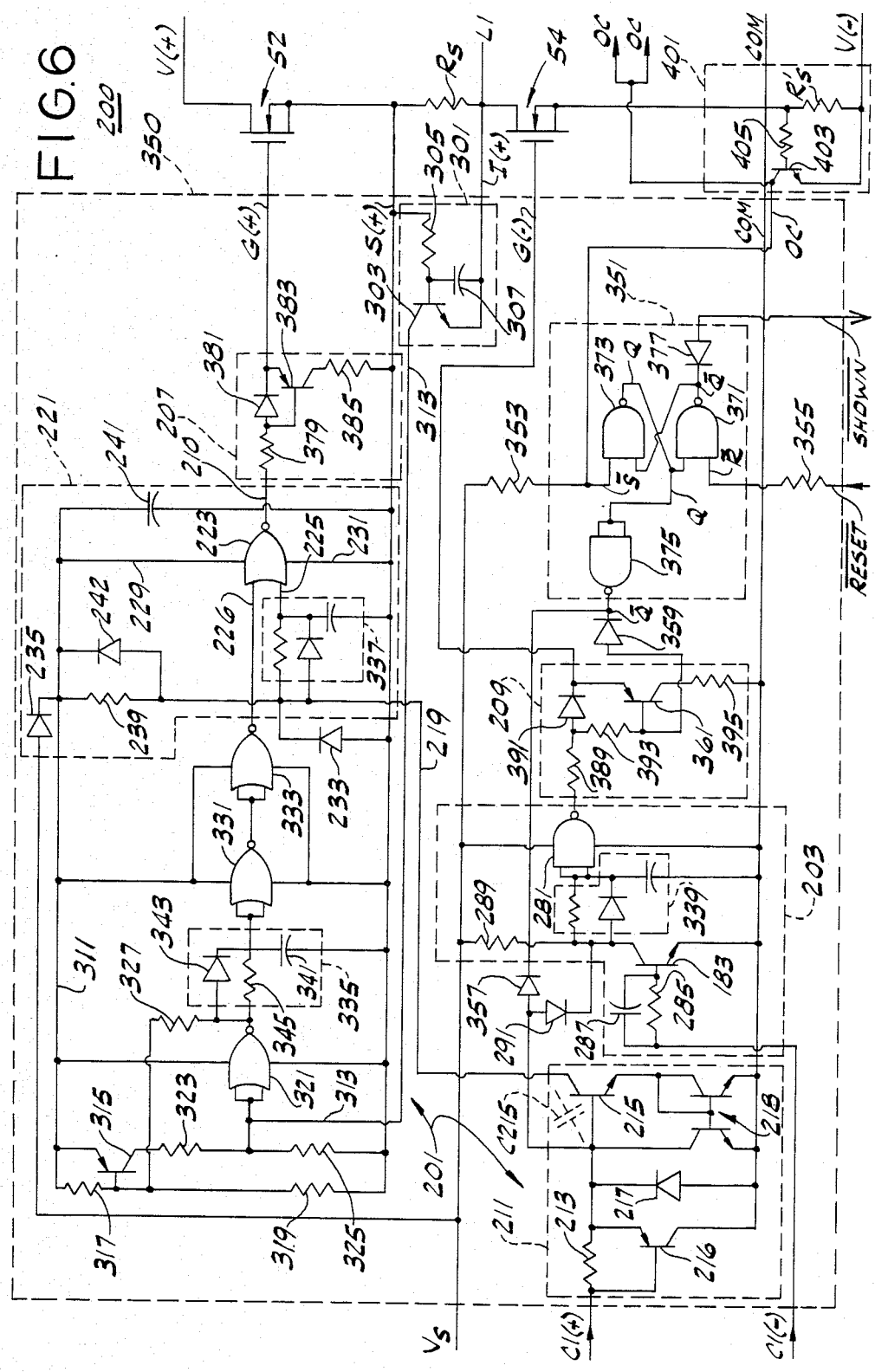
FIG. 6 is a schematic diagram of another electronic circuit for each of the control units of FIG. 1.

FIG. 6 shows a circuit for a control unit 200 for use in substitution for the circuit of FIG. 2 in each of the control units 21, 23, and 25 of FIG. 1. Corresponding circuit portions and devices are given numbers identical with those of FIG. 2 or incremented by 100 where appropriate. Control unit 200 has overcurrent protection, capacitor undervoltage monitoring, and other features in addition to those described in connection with FIG. 2. As with control unit 21, terminals V(+), V(−) for high voltage DC, a terminal for low voltage $V_S$, command signal inputs C1(+) and C1(−), and common COM are included in control unit 200. Two FETs 52 and 54 switch load terminal L1 between terminals V(+) and V(−). A current shunt resistor $R_S$ is provided between load terminal L1 and FET 52 in control unit 200.

First and second circuits 201 and 203 receive command signals at inputs C1(+) and C1(−) and respectively drive FETs 52 and 54 through coupling circuits 207 and 209. Line 210 in FIG. 6 corresponds to input 61 of FIG. 2. Circuits 201 and 203 are roughly analogous to circuits 101 and 103 of FIG. 2, and coupling circuits 207 and 209 are analogous to coupling circuits 77 and 77′. First circuit 201 has a transistor circuit 211 which, like circuit 111 of FIG. 2, acts as a pulse constant-current source as seen on line 219, and constitutes active device circuit means for providing a pulse output relative to common responsive to the command signal or pulse at input C1(+).

Transistor circuit 211 feeds an inverting circuit 221 in circuit 201. Inverting circuit 221 is roughly analogous to inverting circuit 121 of FIG. 2. Inverting circuit 221, among its other operations, level-shifts the information in the command signal at input C1(+) from common COM to load terminal L1.

Transistor circuit 211 has a series resistor 213 for coupling input C1(+) to the base of an NPN transistor 215. Transistor 215 exhibits an inherent capacitance C215. A PNP transistor 216 and a diode 217 protect transistor 215 from excessive positive or negative voltage to the base. Transistor 216 has its base and emitter connected across resistor 213, and its collector connected to common. Transistor 216 provides a low impedance path for transient charging-currents flowing through the inherent capacitance C215 of transistor 215 when input C1(+) is low. Diode 217 provides a corresponding low impedance discharge path for the inherent capacitance C215. An optional diode 217′ is shown on FIG. 2 for corresponding discharge path purposes. Back-to-back current-mirror transistors 218 assist in causing transistor 215 to act as a current source on line 219 when it is turned on.

Inverting circuit 221 utilizes both inputs of a NOR-gate 223 instead of configuring a single-input inverter such as inverter 123 of FIG. 2. NOR-gate 223 has input 225 (analogous to input 125 in FIG. 2) for command pulse drive from transistor circuit 211 on line 219. Unlike FIG. 2, however, NOR-gate 223 has input 226 for receiving an additional signal indicative of an excess current condition in shunt resistor $R_S$ or a capacitor undervoltage condition or other warnings. Because NOR-gate 223 is another type of inverting circuit means, however, it (like inverter 123) defeats instability in switching. Leads 229 and 231, diodes 233 and 235, resistor 239, capacitor 241, and diode 242 all are connected in the same way and cooperate as described in the description of the corresponding leads and components 129, 131, 133, 135, 139, 141, and 142 in FIG. 2.

In second circuit 203, inverter 281, NPN transistor 283, resistor 285, capacitor 287, resistor 289, and diode 291 cooperate in the manner already described with respect to corresponding components 181, 183, 185, 187, 189, and 191 of circuit 103 of FIG. 2.

An overcurrent sensing circuit 301 in FIG. 6 has an NPN transistor 303 with its base-emitter circuit connected across shunt resistor $R_S$ through base resistor 305. A capacitor 307 is connected between the base and emitter of transistor 303 to prevent any noise and spikes from turning transistor 303 on. When and if transistor 303 is turned on by a sufficient voltage resulting from current in excess of a predetermined value in shunt resistor $R_S$, the collector of transistor 303 is switched approximately to the potential of load terminal L1 and a conductor S(+).

Capacitor 241 in circuit 221 keeps an upper conductor 311 supplied with voltage relative to conductor S(+). When transistor 303 is off in overcurrent sensing circuit 301, the voltage on a line 313 connected to its collector is not affected by transistor 303, but is held High by a PNP transistor 315. Transistor 315 has base bias resistors 317 and 319 selected in value for a nominally 0.6 volt base-emitter voltage to bias transistor 315 just on. Resistors 317 and 319 are connected in series between conductors 311 and S(+), and to the base of transistor 315. Transistor 315 feeds an inverter 321 through a voltage divider consisting of resistors 323 and 325. Line 313 from transistor 303 is also connected to the input of 1. A positive feedback resistor 327 produces a "Schmitt trigger" to prevent oscillation at or near the trip point. Inverter 321 feeds cascaded inverters 331 and 333 through a coupling network 335. Inverter 333 feeds NOR-gate 223 on line 226.

Transistor 315 with resistors 317, 319, 323, and 325 constitutes an undervoltage monitoring circuit for capacitor 241. If capacitor 241 falls below a predetermined voltage for powering logic gates 321, 331, 333, and 223, transistor 315 turns off. Inverter 321 produces an output high, which through gates 331 and 333 disables NOR-gate 223 and disables FET 52. Load terminal L1 falls in voltage to common. Diode 235 becomes forward biased from voltage $V_S$ and recharges capacitor 241. If a command pulse persists, NOR-gate 223 turns FET 52 on again. Recharging occurs in a relatively short time such as, for instance, about 20 to 50 microseconds, which is generally considered negligible for most ECM applications. Transistor 315 with resistors 317, 319, 323, and 325 thus constitutes means for sensing the voltage across the capacitor 241 and, upon the capacitor voltage falling below a predetermined level during a high voltage excursion, disabling the inverting circuit means 221 so that the high voltage excursion temporarily ceases and the capacitor is recharged by the low voltage coupling means (e.g., diode 235).

When an overcurrent condition turns on transistor 303, line 313 is brought down to the potential of conductor S(+), and supplies a Low to inverter 321. Inverter 321 produces an output High which is coupled through coupling network 335 and inverters 331 and 333 as a High input on line 226 to NOR gate 223. The output of NOR gate 223 is forced low by the overcurrent condition, driving the gate of FET 52 low at conductor G(+) through coupling circuit 207. FET 52 is consequently turned off, thereby at least reducing the current to motor M at load terminal L1. Even when input C1(+) is high, bringing input 225 of NOR-gate 223 low for turning on or keeping on FET 52, the High input on line 226 caused by transistor 303 turning on acts as an override and turns off FET 52 and keeps it off. Resistor 305 and capacitor 307 are selected in value to provide some time delay after the current is reduced and before the overcurrent Low from transistor 303 is released from line 313.

Circuit 301 together with the circuitry including inverters 321, 331, and 333 constitutes means for sensing current flowing through the electronic switching means (e.g., FET 52) and, upon the current exceeding a predetermined level, for inhibiting or disabling the inverting circuit means 221. Thus, the level-shifting and inverting at NOR-gate 223 are performed only when the current is less than the predetermined level. Inverting circuit means 221 includes NOR-gate 223 which has first input 226 fed by the current sensing means 301, 321, 331, 333 and having second input 225 fed by active device circuit means (e.g., circuit 211). The current sensing means is tied in potential to load connection L1 by pin S(+) and shunt resistor $R_S$.

Three coupling networks 335, 337, and 339 each have the same circuit diagram and function similarly. Network 335 couples the output of inverter 321 to inverter 331; network 337 couples line 219 to input 225 of NOR-gate 223; and network 339 couples the collector of transistor 283 to the input of inverter 281. Network 335 has capacitor 341 which is rapidly charged by a High through diode 343 which is oriented for conduction of current to capacitor 341. A subsequent Low causes capacitor 341 to reverse bias diode 343 and discharge instead through a resistor 345 which is in parallel with diode 343 thereby to provide asymmetrical time delay characteristics. The values of capacitor 341 and resistor 345 are selected for desired discharge time constant. Each coupling network 335, 337, and 339 bypasses stray noise and spikes such as occur in an ECM system when both FET 52 and FET 54 are off during the commutation sequence. The capacitor 341 remains high temporarily after an input High to the network is removed, for a duration depending on the choice of values of the resistor and capacitor components. The capacitor in network 337 capacitively couples input 225 of NOR-gate 223 to the load connection L1. Input 225 of NOR-gate 223 is fed by transistor circuit 211 through the diode in coupling network 337. Network 337 constitutes means for coupling the at least one output (e.g., line 219) of the active device circuit means (e.g., transistor circuit 211) to the at least one input 225 of the inverting circuit 223, the network 337 including at least one additional diode connected in parallel with a resistor and connected between the at least one output of the active device circuit means and the at least one input of the inverting circuit 223, and a capacitor connected between the at least one input 225 and the negative power lead 231.

Part of control unit 200 is advantageously fabricated as an integrated circuit 350 having pins for low supply voltage $V_S$, command signal inputs C1(+) and C1(−), common COM, outputs G(+) and G(−) for the gates of FETs 52 and 54, and overcurrent sensing pins S(+) and I(+) for connection to shunt resistor $R_S$. Three additional pins OC, RESET-bar, and SHDWN-bar for control purposes are next described. While reference is made to circuit 350 as an integrated circuit, it is to be understood that the circuit 350 can, of course, also be manufactured as a circuit built of discrete parts.

Integrated circuit 350 includes a double-NAND gate RS flipflop 351 having low-active inputs R-bar and S-bar and an output Q-bar. The low-active set input S-bar is tied to low voltage $V_S$ through resistor 353 and causes flipflop 351 to change state to Q-bar low and disable integrated circuit 350 if there is a loss of voltage $V_S$. The low-active reset input R-bar resets output Q-bar high when a low is supplied to flipflop 351 through resistor 355.

When Q-bar is high, diodes 357 and 359 are reversebiased, and flipflop 351 does not affect the operation of the rest of integrated circuit 350. When Q-bar goes low, diodes 357 and 359 conduct. Diode 357 brings the base of transistor 215 low regardless of whether a pulse of command signal at input C1(+) is present, and FET 52 is consequently turned off or kept off. Thus, flipflop 351 and diode 357 constitute means for selectively disabling or inhibiting the transistor circuit 211 from providing a pulse output on line 219. Diode 359 brings the base of a PNP transistor 361 low in coupling circuit 209 regardless of whether a pulse of command signal at input C1(−) is present, and FET 54 is consequently turned off or kept off.

Flipflop 351 has two NAND-gates 371 and 373. An inverter 375 inverts a Q output from NAND-gate 373 to produce output Q-bar. NAND-gate 371 produces an output which is logically identical to output Q-bar, so the output of NAND gate 371 is also labeled Q-bar. Control output pin SHDWN-bar is coupled through a diode 377 to the Q-bar output of NAND-gate 371. Because of diode 377, pin SHDWN-bar floats when flipflop 351 is reset, but is brought low when Q-bar goes low. Accordingly, when integrated circuit 350 is disabled by flipflop 351, pin SHDWN-bar is low. Then pin SHDWN-bar can trigger a warning light (not shown) for a user. Pin RESET-bar is connected to a pullup resistor and reset pushbutton switch in conventional manner (not shown), or to additional electronics.

In coupling circuit 207, resistor 379, diode 381, PNP transistor 383, and resistor 385 cooperate in the manner described in connection with the corresponding components 79, 81, 83, and 85 in coupling circuit 77 of FIG. 2, and further discussion is unnecessary. In coupling circuit 209, resistor 389 and diode 391 provide a path for a High from inverter 281 to turn on FET 54. The gate of FET 54 is connected to the emitter of transistor 361. When the output of inverter 281 goes low, a charge remains on the gate of FET 54 which must be discharged to turn FET 54 off. A base resistor 393 with collector resistor 389 and transistor 361 provide a path for such discharge. The sum of the values of resistor 393 and resistor 389 is selected so that the gate voltage on FET 54 turns transistor 361 on. Then transistor 361 discharges the gate of FET 54 through resistor 395 at a rate set by the value of resistor 395.

An additional overcurrent protection circuit 401 for control unit 200 is in some embodiments provided external to integrated circuit 350. An additional shunt resistor RS' is inserted between negative return V(−) and the common COM pin of integrated circuit 350. The COM pin in circuit 350 in each of the control units 21, 23, and 25 is connected to the COM pin in each of the other control units 21, 23, and 25. Conductor 15 in HV supply 11 is connected to the V(−) terminal on the single resistor R′$_S$ and the V(−) terminals of the other two control units 23 and 25 are left unconnected so that all motor current passes through the single resistor R′$_S$. An NPN transistor 403 has a base resistor 405 selected in value so that load current in excess of a preselected value in shunt resistor RS′ turns on transistor 403. The collector of transistor 403 goes low at control pin OC of each circuit 350 in each of the control units 21, 23, and 25 to all of which the collector of transistor 403 is connected. The Low at control pin OC brings the set input S-bar of flipflop 351 low, setting or actuating the flip-flop, bringing output Q-bar low and disabling the integrated circuit 350 in all control units 21, 23, 25 through diodes 357 and 359. Thus, circuit 401 constitutes means for sensing load current and, upon the current exceeding a predetermined level, for actuating flipflop 351 in all of control units to which ECM M is connected. In this way, the process of providing pulses on line 219 from transistor circuit 211 is inhibited in each control unit.

Figure 7:
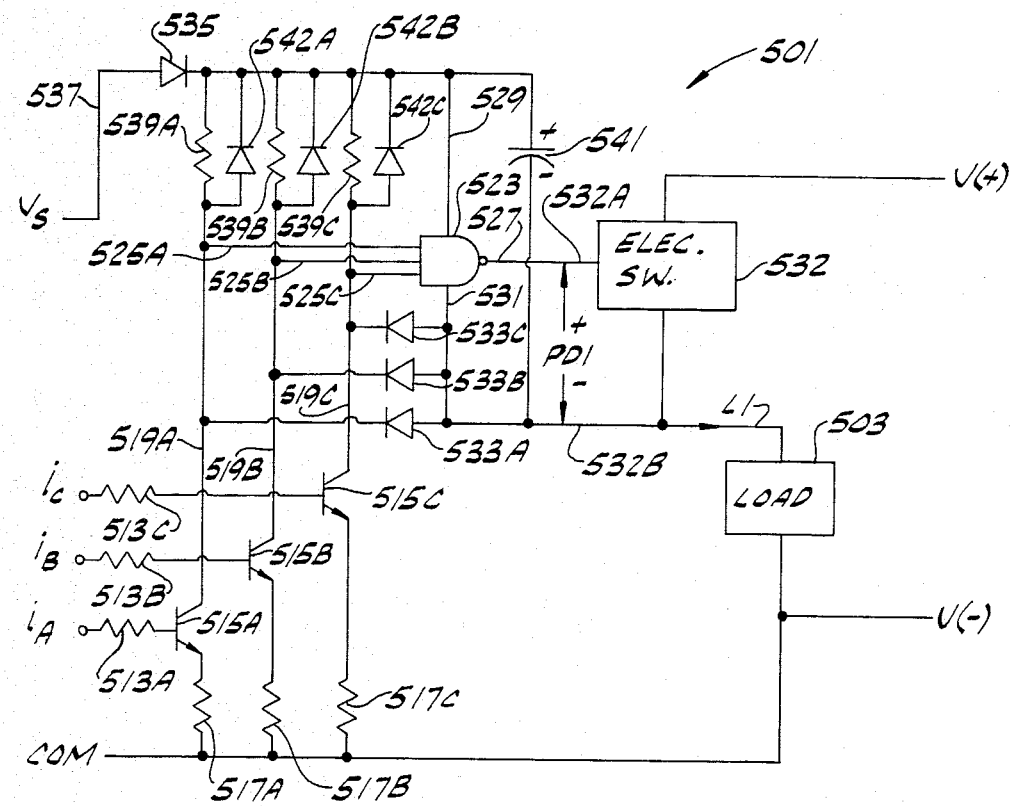
FIG. 7 is a schematic diagram of another form of an electronic control circuit according to the invention.

In FIG. 7 a control unit 501 is powered by low voltage V$_S$ relative to common COM and controllably switches high voltage at terminals V(+) and V(−) to a load 503. As in the circuits of FIGS. 2 and 6, load 503 can be a motor, a transformer, a fluorescent or other lamp, a resistor, an induction heating element or any other load chosen for a useful application. Input command signals i$_A$, i$_B$, and i$_C$ are fed through resistors 513A, 513B, and 513C to the bases of NPN transistors 515A, 515B, and 515C. The transistors act as current sources with their emitters connected to common COM through resistors 517A, 517B, and 517C, and each of the transistors exhibits an inherent capacitance which is used to advantage. Transistors 515A, 515B, and 515C each act as a pulse constant-current source as seen on lines 519A, 519B, and 519C, and constitute active device circuit means for providing a pulse output relative to common responsive to the input command signals.

A NAND gate 523 constitutes an inverting circuit in the embodiment of FIG. 7 and has three inputs 525A, 525B, and 525C and an output 527. NAND gate 523 has positive and negative power leads 529 and 531. The collectors of transistors 515A, 515B, and 515C are connected by lines 519A, 519B, and 519C to the inputs 525A, 525B, and 525C of NAND gate 523. The output 527 of NAND gate 523 is connected to and drives or feeds an electronic switch 532 with a digital potential difference across input points 532A and 532B. Negative power lead 531 is connected to input point 532B. A set of three diodes 533A, 533B, and 533C have their cathodes respectively connected to line 519A, 519B, and 519C and their anodes connected together to negative power lead 531 and load connection L1. These three diodes assist in accomplishing an advantageous latching or voltage substituting function as described in more detail hereinafter.

A diode 535 is connected to first power lead 529 from low voltage power source 31 of FIG. 1 so that low voltage V$_S$ powers NAND gate 523 when the load 503 voltage on load terminal L1 is near common COM. Diode 535 is thus connected in easy-current direction so as to permit power to be transferable from a low voltage terminal or line 537 to NAND gate 523. Diode 535 is also connected in series with a set of resistors 539A, 539B, and 539C to the respective inputs 525A, 525B, and 525C of NAND gate 523 and to lines 519A, 519B, and 519C for completing the collector circuits for transistors 515A, 515B, and 515C. The positive power lead 529 of NAND gate 523 is connected to diode 535 cathode opposite to the anode connection at the low voltage terminal or line 537 for V$_S$. A capacitor 541 is wired between or across the positive and negative power leads 529 and 531 of NAND gate 523 and constitutes means for temporarily maintaining power coupled thereto so as to maintain power on gate 523 during high voltage excursions of load terminal L1 during the switching process. Diode 535 is also connected to capacitor 541 and constitutes means for conducting low voltage power to NAND gate 523 and to capacitor 541 prior to the high voltage excursions and for isolating NAND-gate 523 from low voltage V$_S$ line 537 during the high voltage excursions. Another set of diodes 542A, 542B, and 542C act as protective devices for the inputs 525A, 525B, and 525C of NAND gate 523 by preventing inputs 525A, 525B, and 525C from rising in voltage more than one diode drop above the voltage of capacitor 541.

Diodes 533A, 533B, and 533C are connected between the collectors of transistors 515A, 515B, and 515C and the negative power lead 531 of NAND gate 523 so as to provide an easy-current direction relative to their respective resistors 539A, 539B, and 539C opposite to the easy-current direction of diode 135 relative to each such resistor.

In a method utilized in the control unit 501 of FIG. 7, each command signal i$_A$, i$_B$, and i$_C$ is level-shifted away from common COM and inverted so as to provide a potential difference PD1 to electronic switch 532. By virtue of the inherent capacitance of transistors 515A, 515B, and 515C and the presence of diodes 533A, 533B, and 533C, voltages are derived across diodes 533A, 533B, and 533C from the voltage at load terminal L1 when the voltage thereat is changing to the high voltage V(+). Because diodes 533A, 533B, and 533C are wired between inputs 525A, 525B, and 525C and negative power lead 531 of NAND gate 523, the derived voltages equal to one diode drop are substituted for the pulses on lines 519A, 519B, and 519C produced by transistors 515A, 515B, and 515C and only during the duration of the shortest one of the input command pulses because gate 523 is a NAND gate. NAND gate 523 ANDs and inverts the derived voltages and applies the resulting output as the potential difference PD1 to electronic switch 532.

In another embodiment a multi-input NOR gate is substituted for NAND gate 523 of FIG. 7. Then an input High on any one of input lines i$_A$, i$_B$, or i$_C$ switches electronic switch 532 through the NOR-gate.

Figure 8:
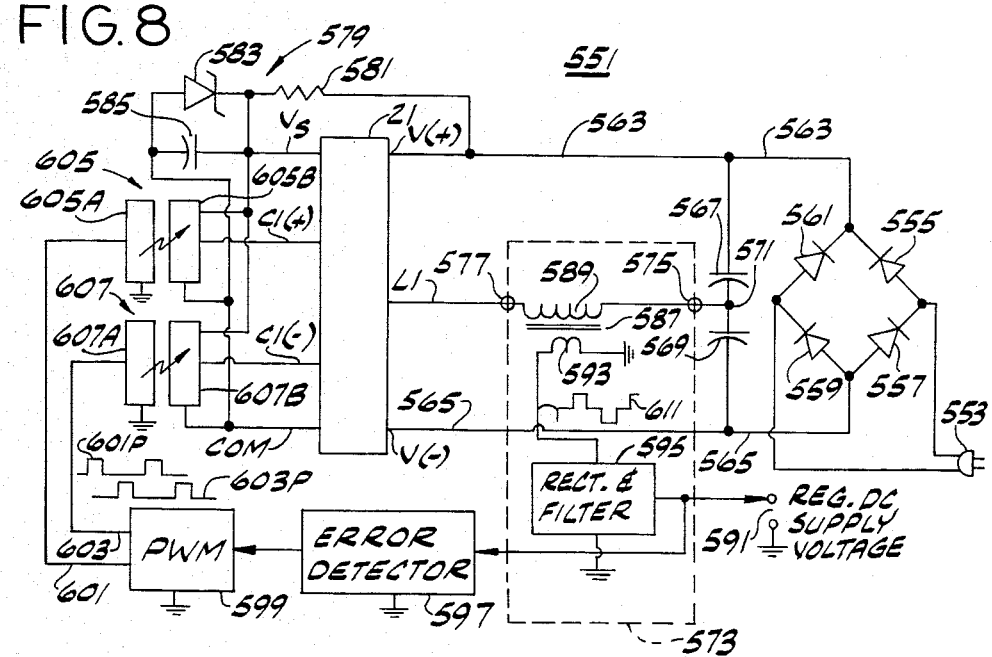
FIG. 8 is a partially block, partially schematic diagram of yet another form of an electronic control circuit according to the invention, operating as a regulated power supply.

In FIG. 8 an electronic control circuit 551 of the invention operates as a switching regulator power supply. Electrical A.C. power at plug 553 is full wave rectified by a bridge consisting of diodes 555, 557, 559, and 561, which constitutes means for supplying a rectified A.C. voltage to first and second conductors 563 and 565. The rectified A.C. voltage on conductors 563 and 565 is filtered by electrolytic capacitors 567 and 569. Capacitors 567 and 569 are connected to each other at a node 571 and connected in series across the conductors 563 and 565.

A circuit 573 constitutes means for utilizing electrical energy having first and second terminals 575 and 577. Terminal 575 is connected to capacitors 567 and 569 at node 571. ("Terminal" as the term is used herein denotes any selected reference point in a circuit.)

A control unit is shown in FIG. 8 with numeral 21 to indicate that it has a circuit represented by the schematic diagram of FIG. 2. Control unit 21 is provided with high voltage DC at terminals V(+) and V(−) on conductors 563 and 565, and has its load terminal L1 connected to terminal 577 of circuit 573. Terminals V(−) and COM are internally connected in control unit 21 as shown in FIG. 2. Low voltage $V_S$ is obtained from a network 579 connected between terminals V(+) and COM. Network 579 has a dropping resistor 581, zener diode 583 for regulating the voltage $V_S$, and a filter capacitor 585.

Control unit 21 responds to command pulses at terminals C1(+) and C1(−) to alternately switch the terminal 577 of circuit 573 to the conductors 563 (V(+)) and 565 (V(−)) in response to the command pulses. The switching occurs at a selected rate in the range of generally about 10 KHz to 60 KHz and higher, which is relatively high compared to 50 Hz and 60 Hz power frequencies. A transformer 587 is advantageously physically much smaller by virtue of the high switching rate than it would be if a low power line frequency were impressed across it. A primary winding 589 of transformer 587 has the terminals 575 and 577.

In computer and other power supply applications it is frequently desirable to maintain electrical isolation between parts connected to the power plug 553 and parts connected to a set of terminals 591 for regulated D.C. supply voltage. A secondary winding 593 of transformer 587 is electrically isolated from primary winding 589. Secondary winding 593 feeds a conventional rectifier and filter network 595 to produce the supply voltage at terminals 591.

For regulating purposes, the supply voltage at terminals 591 is fed to a conventional error detector 597 which senses departures from a preselected value of the supply voltage produced by network 595. An error signal is fed from error detector 597 to a pulse width modulator 599. Pulse width modulator 599 is of a conventional and commercially available type familiar to those skilled in the art, and produces first and second series of pulses 601P and 603P on a pair of lines 601 and 603. The series of pulses 601P and 603P are suitably identical in duty cycle but displaced in time so that the pulses of series 601P are on when the pulses of series 603P are off, as shown in FIG. 8.

Heretofore in switching regulator power supplies, it is believed that the series of pulses such as 601P and 603P were fed to pulse transformers for electrical isolation and for driving electronic switching devices and thus switching terminal 577 between conductors 563 and 565. The use of such pulse transformers is avoided in the present embodiment, resulting in advantages of even smaller circuit size and economy. Instead of pulse transformers, control unit 21 accomplishes a level-shifting operation and positively switches both upper and lower FETs 52 and 54 of FIG. 2.

A pair of optoisolators 605 and 607 optically couple the pulses 601P and 603P on lines 601 and 603 to the terminals C1(+) and C1(−), respectively. At the same time optoisolators 605 and 607 achieve and complete a desirable electrical isolation between control unit 21 and terminals 591. The optoisolators 605 and 607 have respective optically coupled but electrically isolated portions 605A,605B and 607A,607B. The portions 605B and 607B which feed command pulses to control unit 21 at terminals C1(+) and C1(−) are powered if necessary from low voltage $V_S$ and returned to common COM and *not* to the ground connection for the regulated DC supply voltage at terminals 591. Secondary winding 593, rectifier and filter network 595, error detector 597, pulse width modulator 599, and optoisolator portions 605A and 607A are all returned (as indicated by earth ground symbols) to the ground connection of terminals 591 and *not* to common COM. Power for error detector 597 and pulse width modulator 599 is obtained from rectifier and filter network 595 in a conventional manner and not from low voltage $V_S$. In this way optoisolators 605 and 607 achieve electrical isolation at a low voltage level and the circuitry of control unit 21 separately accomplishes level-shifting to the voltage level of an upper FET, obviating any need for one or more pulse transformers for driving FETs.

Error detector 597 constitutes means for sensing departures from a preselected value of the supply voltage. Pulse width modulator 599 responds to error detector 597 to supply the command pulses variably (e.g., in duty cycle) to counteract the departures. Optoisolators 605 and 607 constitute optoelectronic means for coupling the command pulses to the control unit from the means for supplying the command pulses variably (e.g., pulse width modulator 599).

Control unit 21 acts as an electronic 3 position on-off-on switch which switches terminal 577 high to V(+), then lets it float, then switches it low to V(−), then lets it float, and repeats the sequence. Because of the sequence, capacitors 567 and 569 charge and discharge in such a way that node 571 is high when terminal 577 is switched low, and node 571 is low when load terminal 577 is switched high. A voltage having a waveform generally resembling waveform 611 is induced across the secondary winding 593 of transformer 587. The waveform 611 is rectified and filtered to produce the supply voltage at terminals 591. The supply voltage at terminals 591 is regulated by the variations in duty cycle of the pulses 601P and 603P because the pulse widths of pulses 601P and 603P are reflected in the pulse widths of the waveform 611 by operation of control unit 21.

Overcurrent protection and other features are added to the circuit of FIG. 8 in a straightforward way by the use of integrated circuit 350 of FIG. 6 in place of unit 21 of FIG. 2. A variety of logic functions can be implemented on multiple inputs as in FIG. 7 or by adding NAND, NOR and other logic gates for instance between optoisolator portion 605B and terminal C1(+).

Loads such as a fluorescent light or an induction cooking element are driven in still other embodiments by substituting them for circuit 573 between terminals 575 and 577. The pulses on lines 601 and 603 are in such embodiments provided by a multivibrator with selectable duty cycles depending on a desired brightness of a lamp or a desired amount of heating by a heating element.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What I claim as new and desire to secure by Letters Patent of the United States is:

1. For use in electrical load powering apparatus having a load connection, a high voltage supply connection and a common, and including electronic means for switching the high voltage supply connection to the load connection, the electronic switching means having an input and being responsive to a control voltage difference between the input and the load connection, the load connection being subject to high voltage excursions relative to common due to the switching, an electronic control circuit comprising:

active device circuit means for providing at least one pulse output relative to common and having at least one inherent capacitance;

inverting circuit means connected to the load connection for inverting the at least one pulse output of said active device circuit means to produce the control voltage difference between the electronic switching means input and the load connection; and means for charging said at least one inherent capacitance of said active device circuit means for the high voltage supply connection when one of the high voltage excursions occurs.

2. The electronic control circuit as set forth in claim 1 further comprising means for discharging said at least one inherent capacitance of said active device circuit means when one of the high voltage excursions ceases.

3. The electronic control circuit as set forth in claim 1 further comprising means for temporarily maintaining power on said inverting circuit means during the high voltage excursions.

4. The electronic control circuit as set forth in claim 3 further comprising means for coupling a relatively low voltage to said means for temporarily maintaining power when one of the high voltage excursions has ceased and for isolating said temporary power maintaining means from the relatively low voltage during the high voltage excursions.

5. The electronic control circuit as set forth in claim 1 wherein said inverting circuit means includes an inverter having only one input.

6. The electronic control circuit as set forth in claim 1 wherein said inverting circuit means includes a NOR-gate.

7. The electronic control circuit as set forth in claim 1 wherein said inverting circuit means includes a NAND-gate.

8. The electronic control circuit as set forth in claim 1 further comprising means for sensing current flowing through the electronic switching means and, upon the current exceeding a predetermined level, for disabling said inverting circuit means.

9. The electronic control circuit as set forth in claim 8 wherein said current sensing means is also tied in potential to the load connection.

10. The electronic control circuit as set forth in claim 1 wherein said inverting circuit means is fed by said active device circuit means through at least one coupling network.

11. The electronic control circuit as set forth in claim 1 further comprising means for selectively disabling said active device circuit means from providing the at least one pulse output.

12. The electronic control circuit as set forth in claim 1 wherein said active device circuit means comprises a transistor circuit responsive to successive input pulses.

13. For use in electrical load powering apparatus having a load connection, a high voltage supply connection and a common, and including electronic means for switching the high voltage supply connection to the load connection, the electronic switching means having an input and being responsive to a control voltage difference between the input and the load connection, the load connection being subject to high voltage excursions relative to the common due to the switching, an electronic control circuit comprising:

active device circuit means for providing at least one pulse output relative to common and having at least one inherent capacitance;

inverting circuit means connected to the load connection for inverting the at least one pulse output of said active device circuit means to produce the control voltage difference between the electronic switching means input and the load connection, said inverting circuit means including an inverter with an input connected to said active device circuit means; and means for charging said at least one inherent capacitance of said active device circuit means when one of the high voltage excursions occurs, said means for charging including a diode connected from the load connection to said inverter input.

14. For use in electrical load powering apparatus having a load connection, a high voltage supply connection and a common, and including electronic means for switching the high voltage supply connection to the load connection, the electronic switching means having an input and being responsive to a control voltage difference between the input and the load connection, the load connection being subject to high voltage excursions relative to the common due to the switching, an electronic control circuit comprising:

active device circuit means for providing at least one pulse output relative to common and having at least one inherent capacitance;

inverting circuit means connected to the load connection for inverting the at least one pulse output of said active device circuit means to produce the control voltage difference between the electronic switching means input and the load connection, said inverting circuit means including an inverter with an input connected to said active device circuit means;

means for charging said at least one inherent capacitance of said active device circuit means when one of the high voltage excursions occurs; and means for discharging said at least one inherent capacitance of said active device circuit means when one of the high voltage excursions ceases, said means for discharging comprising a diode and a capacitor connected in series from said load connection to said inverter input.

15. For use in electrical load powering apparatus having a load connection, a high voltage supply connection and a common, and including electronic means for switching the high voltage supply connection to the load connection, the electronic switching means having an input and being responsive to a control voltage difference between the input and the load connection, the load connection being subject to high voltage excursions relative to the common due to the switching, an electronic control circuit comprising:

active device circuit means for providing at least one pulse output relative to common and having at least one inherent capacitance;

inverting circuit means connected to the load connection for inverting the at least one pulse output of said active device circuit means to produce the control voltage difference between the electronic switching means input and the load connection;

means for charging said at least one inherent capacitance of said active device circuit means when one of the high voltage excursions occurs;

a capacitor for temporarily maintaining power on said inverting circuit means during the high voltage excursions;

means for coupling a relatively low voltage to said capacitor when one of the high voltage excursions has ceased and for isolating said capacitor from the relatively low voltage during the high voltage excursions; and means for sensing the voltage across the capacitor and, upon the capacitor voltage falling below a predetermined level during a high voltage excursion, disabling said inverting circuit means so that the high voltage excursion temporarily ceases and the capacitor is recharged by the low voltage coupling means.

16. For use in electrical load powering apparatus having a load connection, a high voltage supply connection and a common, and including electronic means for switching the high voltage supply connection to the load connection, the electronic switching means having an input and being responsive to a control voltage difference between the input and the load connection, the load connection being subject to high voltage excursions relative to the common due to the switching, an electronic control circuit comprising:

active device circuit means for providing at least one pulse output relative to common and having at least one inherent capacitance and including a plurality of transistor circuits, said active device circuit means including a plurality of transistor circuits;

inverting circuit means connected to the load connection for inverting the at least one pulse output of said active device circuit means to produce the control voltage difference between the electronic switching means input and the load connection, said inverting circuit means including a NAND-gate having a plurality of inputs, said plurality of transistor circuits feeding respective pulse outputs to said plurality of inputs; and charging means for charging said at least one inherent capacitance of said active device circuit means when one of the high voltage excursions occurs, said charging means including a plurality of diodes respectively connected to said transistor circuits from said load connection.

17. For use in electrical load powering apparatus having a load connection, a high voltage supply connection and a common, and including electronic means for switching the high voltage supply connection to the load connection, the electronic switching means having an input and being responsive to a control voltage difference between the input and the load connection, the load connection being subject to high voltage excursions relative to the common due to the switching, an electronic control circuit comprising:

active device circuit means for providing at least one pulse output relative to common and having at least one inherent capacitance;

inverting circuit means connected to the load connection for inverting the at least one pulse output of said active device circuit means to produce the control voltage difference between the electronic switching means input and the load connection, said inverting circuit means including a NOR-gate having a first and second input;

means for charging said at least one inherent capacitance of said active device circuit means when one of the high voltage excursions occurs; and current sensing means for sensing current flowing through the electronic switching means and, upon the current exceeding a predetermined level, for disabling said inverting circuit means, said NOR-gate having the first input fed by said current sensing means and the second input fed by said active device circuit means.

18. The electronic control circuit as set forth in claim 17 wherein said second input of said NOR gate is capacitively coupled to the load connection and fed by said active device circuit means through a diode.

19. For use in electrical load powering apparatus having a load connection, a high voltage supply connection and a common, and including electronic means for switching the high voltage supply connection to the load connection, the electronic switching means having an input and being responsive to a control voltage difference between the input and the load connection, the load connection being subject to high voltage excursions relative to the common due to the switching, an electronic control circuit comprising:

active device circuit means for providing at least one pulse output relative to common and having at least one inherent capacitance;

inverting circuit means connected to the load connection for inverting the at least one pulse output of said active device circuit means to produce the control voltage difference between the electronic switching means input and the load connection;

means for charging said at least one inherent capacitance of said active device circuit means when one of the high voltage excursions occurs;

disabling means for selectively disabling said active device circuit means from providing the at least one pulse output, said disabling means comprising a flipflop; and means for sensing load current and, upon the current exceeding a predetermined level, for actuating said flip-flop.

20. Laundry apparatus comprising:

means operable generally in a laundering mode for agitating fluid and fabrics to be laundered therein and operable generally in spin mode for thereafter spinning the fabrics to effect centrifugal displacement of fluid from the fabrics;

an electronically commutated motor including a stationary assembly having a plurality of winding stages adapted to be selectively commutated, and rotatable means associated with said stationary assembly in selective magnetic coupling relation with said winding stages for driving said agitating and spinning means in the laundering mode operation and in the spin mode operation thereof upon the commutation of said winding stages;

first and second conductors for supplying power, said second conductor constituting a common; and control units for commutating said winding stages by selectively switching said winding stages at respective terminals thereof to said first and second conductors in response to command pulses, each of said control units including:

electronic switching means for switching a respective said terminal to said first conductor, said electronic switching means having an input and being responsive to a control voltage difference between said input and said respective terminal, said respective terminal being subject to high voltage excursions relative to said common due to the switching;

active device circuit means for providing at least one pulse output relative to common in response to at least some of the command pulses and having at least one inherent capacitance;

inverting circuit means connected to said respective terminal for inverting the at least one pulse output of said active device circuit means to produce the control voltage difference between the input of said electronic switching means and said respective terminal; and means for charging said at least one inherent capacitance of said active device circuit means when one of the high voltage excursions occurs.

21. Laundry apparatus as set forth in claim 20 wherein each of said control units further includes means for discharging said at least one inherent capacitance of said active device circuit means when one of the high voltage excursions ceases.

22. Laundry apparatus as set forth in claim 20 wherein each of said control units further includes means for sensing current flowing through said electronic switching means and, upon the current exceeding a predetermined level, for disabling said inverting circuit means.

23. Laundry apparatus as set forth in claim 20 wherein each of said control units further includes an additional circuit having second electronic means for switching a respective said terminal to common, said additional circuit being responsive to at least some second ones of the command pulses.

24. Laundry apparatus as set forth in claim 20 wherein each of said control units further includes an additional circuit having second electronic means for switching a respective said terminal to common, said additional circuit being responsive to at least some second ones of the command pulses and further having means for preventing said active device circuit means from responding to any of the command pulses when one of the second ones of the command pulses is present.

25. Laundry apparatus as set forth in claim 20 wherein each of said control units further includes disabling means for selectively disabling said active device circuit means from providing the at least one pulse output, and the laundry apparatus further comprises means for sensing load current and, upon the current exceeding a predetermined level, for actuating said disabling means in all of said control units.

26. Laundry apparatus as set forth in claim 20 wherein said means for charging said at least one inherent capacitance is connected to said respective terminal.

27. Laundry apparatus comprising:

means operable generally in a laundering mode for agitating fluid and fabrics to be laundered therein and operable generally in a spin mode for thereafter spinning the fabrics to effect centrifugal displacement of fluid from the fabrics;

an electronically commutated motor including a stationary assembly, a plurality of winding stages adapted to be selectively commutated associated with said stationary assembly and having a plurality of terminals, and rotatable means associated with said stationary assembly and in selectively magnetic coupling relation with said winding stages for driving said agitating and spinning means in the laundering mode operation and in the spin mode operation thereof upon the selective commutation of said winding stages;

first and second conductors for supplying power, said second conductor comprising a common; and a plurality of control means for commutating at least some of said winding stages by selectively switching said at least some winding stages at at least one terminal thereof to one of said first and second conductors in response to command pulses applied to said control means, at least some of said control means including:

electronic switching means for switching said at least one terminal to said first conductor, said electronic switching means having an input and being responsive to a control voltage difference between said input and said at least one terminal, said at least one terminal being subject to high voltage excursions relative to common due to the switching of said at least one terminal to said first conductor;

active device circuit means for providing at least one pulse output relative to common in response to at least some of the command pulses and having at least one inherent capacitance;

inverting circuit means connected to said at least one terminal for inverting the at least one pulse output of said active device circuit means to produce the control voltage difference between the input of said electronic switching means and said at least one terminal;

means for charging the at least one inherent capacitance of said active device circuit means from said first conductor when one of the high voltage excursions occurs;

means for discharging the at least one inherent capacitance of said active device circuit means when one of the high voltage excursions ceases; and means for sensing current flowing through said electronic switching means and, upon the current exceeding a predetermined level, for disabling said inverting circuit means.

28. Laundry apparatus as set forth in claim 27 wherein at least one of said at least some control means further includes a circuit having second electronic means for switching said at least one terminal to common, said circuit being responsive to some others of the command pulses.

29. Laundry apparatus as set forth in claim 27 wherein at least one of said at least some control means further includes a circuit having second electronic means for switching said at least one terminal to common, said circuit being responsive to some others of the command pulses and further having means for preventing said active device circuit means for responding to any of the command pulses when one of the some other command pulses is present.

30. Laundry apparatus as set forth in claim 27 wherein at least one of said at least some control means further includes means for coupling an output of said active device circuit means to an input of said inverting circuit means.

31. Laundry apparatus as set forth in claim 27 wherein said means for charging said at least one inherent capacitance is connected to said at least one terminal.

32. Laundry apparatus comprising:

means operable generally in a laundering mode for agitating fluid and fabrics to be laundered therein and operable generally in a spin mode for thereafter spinning the fabrics to effect centrifugal displacement of fluid from the fabrics;

an electronically commutated motor including a stationary assembly, a plurality of winding stages adapted to be selectively commutated associated with said stationary assembly and having a plurality of terminals, and rotatable means associated with said stationary assembly in selective magnetic coupling relation with said winding stages for driving said agitating and spinning means in the laundering mode operation and in the spin operation thereof upon the commutation of said winding stages;

first and second conductors for supplying power, said second conductor constituting a common; and a plurality of control means for commutating at least some of said winding stages by selectively switching said at least some winding stages at at least one terminal thereof to one of said first and second conductors in response to command pulses applied to said control means, at least some of said control means including:

electronic switching means for switching said at least one terminal to said first conductor, said electronic swtiching means having an input and being responsive to a control voltage difference between said input and said at least one terminal, said at least one terminal being subject to high voltage excursions relative to common due to the switching of said at least one terminal to said first conductor;

active device circuit means for providing at least one pulse output relative to common in response to at least some of the command pulses and having at least one inherent capacitance;

inverting circuit means connected to said at least one terminal for inverting the at least one pulse output of said active device circuit means to produce the control voltage difference between the input of the electronic switching means and said at least one terminal;

means for coupling an output of said active device circuit means to an input of said inverting circuit means, said coupling means including a diode connected in parallel with a resistor and connected between said output of said active device means and said input of said inverting circuit means, and a capacitor connected between said inverting circuit means input and said at least one terminal;

means for charging said at least one inherent capacitance of said active device circuit means when one of the high voltage excursions occurs;

means for discharging the at least one inherent capacitance of said active device circuit means when one of the high voltage excursions ceases; and means for sensing current flowing through the electronic switching means and, upon the current exceeding a predetermined level, for disabling said inverting circuit means.

33. Laundry apparatus comprising:

means operable generally in a laundering mode for agitating fluid and fabrics to be laundered therein and operable generally in spin mode for thereafter spinning the fabrics to effect centrifugal displacement of fluid from the fabrics;

an electronically commutated motor including a stationary assembly, a plurality of winding stages adapted to be selectively commutated associated with said stationary assembly and having a plurality of terminals, and rotatable means associated with said stationary assembly and in selective magnetic coupling relation with said winding stages for driving said agitating and spinning means in the laundering mode operation and in the spin mode operation thereof upon the selective commutation of said winding stages;

first and second conductors for supplying power, said second conductor comprising a common; and a plurality of control means for commutating at least some of said winding stages by selectively switching said at least some winding stages at at least one terminal thereof to one of said first and second conductors in response to command pulses applied to said control means, at least some of said control means including:

electronic switching means for switching said at least one terminal to said first conductor, said electronic switching means having an input and being responsive to a control voltage difference between said input and said at least one terminal, said at least one terminal being subject to high voltage excursions relative to common due to the switching of said at least one terminal to said first conductor;

active device circuit means for providing at least one pulse output relative to common in response to at least some of the command pulses and having at least one inherent capacitance;

inverting circuit means connected to said at least one terminal for inverting the at least one pulse output of said active device circuit means to produce the control voltage difference between the input of said electronic switching means and said at least one terminal;

means for charging the at least one inherent capacitance of said active device circuit means from said first conductor when one of the high voltage excursions occurs;

means for discharging the at least one inferent capacitance of said active device circuit means when one of the high voltage excursions ceases; and a circuit having at least another electronic means for switching said at least one terminal to common, said circuit being responsive to some others of the command pulses and further having means for preventing said active device circuit means from responding to any of the command pulses when one of the some other command pulses is present.

34. Laundry apparatus as set forth in claim 33 wherein at least one of said at least some control means further includes disabling means for selectively disabling said active device circuit means from providing the at least one pulse output.

35. Laundry apparatus as set forth in claim 34 further comprising means for sensing current in said motor and, upon the current exceeding a preestablished value, for actuating said disabling means in said at least one of said at least some control means.

36. Laundry apparatus as set forth in claim 33 wherein said at least some control means each further include disabling means for selectively disabling said active device circuit means from providing the at least one pulse output, and the laundry apparatus further comprises means for sensing current in said motor and, upon the current exceeding a preestablished value, for actuating said disabling means in said at least some control units.

37. Laundry apparatus as set forth in claim 33 wherein said means for charging said at least one inherent capacitance is connected to said at least one terminal.

38. Laundry apparatus comprising:
means operable generally in a laundering mode for agitating fluid and fabrics to be laundered therein and operable generally in a spin mode for thereafter spinning the fabrics to effect centrifugal displacement of fluid from the fabrics;
an electronically commutated motor including a stationary assembly, a plurality of winding stages adapted to be selectively commutated associated with said stationary assembly and having a plurality of terminals, and rotatable means associated with said stationary assembly and in selective magnetic coupling relation with said winding stages for driving said agitating and spinning means in the laundering mode operation and in the spin mode operation thereof upon the selective commutation of said winding stages;
first and second conductors for supplying power, said second conductor comprising a common; and
a plurality of control means for commutating at least some of said winding stages by selecting switching said at least some winding stages at at least one terminal thereof to one of said first and second conductors in response to command pulses applied to said control means, at least some of said control means including:
electronic switching means for switching said at least one terminal to said first conductor, said electronic switching means having an input and being responsive to a control voltage difference between said input and said at least one terminal, said at least one terminal being subject to high voltage excursions relative to common due to the switching of said at least one terminal to said first conductor;
active device circuit means for providing at least one pulse output relative to common in response to at least some of the command pulses and having at least one inherent capacitance;
means for charging the at least one inherent capacitance of said active device circuit means when one of the high voltage excursions occurs;
inverting circuit means connected to said at least one terminal for inverting the at least one pulse output of said active device circuit means to produce the control voltage difference between the input of said electronic switching means and said at least one terminal, said inverting circuit means having capacitor means for storing a voltage from a supply voltage connection so that said inverting circuit means is able to be powered during the high voltage excursions; and
means for sensing the voltage across said capacitor means and, upon the capacitor means voltage falling below a predetermined level during one of the high voltage excursions, for disabling said inverting circuit means so that the high voltage excursion temporarily ceases and said capacitor means is able to be recharged from the supply voltage connection.

39. Laundry apparatus as set forth in claim 38 wherein at least one of said at least some control means further includes a circuit having at least another electronic means for switching said at least one terminal to common, said circuit being responsive to some others of the command pulses and further having means for preventing said active device circuit means from responding to any of the command pulses when one of the some other command pulses is present.

40. Laundry apparatus as set forth in claim 38 wherein at least one of said at least some control means further includes means for sensing current flowing through said electronic switching means and, upon the current exceeding another predetermined level, for disabling said inverting circuit means.

41. Laundry apparatus as set forth in claim 38 wherein said inverting circuit means includes a NOR-gate having a first input fed by said voltage sensing and disabling means and having a second input fed by said active device circuit means.

42. Laundry apparatus comprising:
agitating and spinning means operable generally in a laundering mode for agitating fluid and fabrics to be laundered therein and operable generally in a spin mode for thereafter spinning the fabrics to effect centrifugal displacement of fluid from the fabrics;
an electronically commutated motor including a stationary assembly, a plurality of winding stages adapted to be selectively commutated associated with said stationary assembly and having a plurality of terminals, and rotatable means associated with said stationary assembly and in selective magnetic coupling relation with said winding stages for driving said agitating and spinning means in the laundering mode operation and in the spin mode operation thereof upon the selective commutation of said winding stages;
first and second conductors for supplying power, said second conductor comprising a common; and
a plurality of control means for commutating at least some of said winding stages by selectively switching said at least some winding stages at at least one terminal thereof to one of said first and second conductors in response to command pulses applied to said control means, at least some of said control means including:
electronic switching means for switching said at least one terminal to said first conductor, said electronic switching means having an input and being responsive to a control voltage difference between said input and said at least one terminal, said at least one terminal being subject to high voltage excursions relative to common due to the switching of said at least one terminal to said first conductor;
active device circuit means for providing at least one pulse output relative to common in response to some of the command pulses and having at least one inherent capacitance;

inverting circuit means connected to said at least one terminal for inverting the at least one pulse output of said active device circuit means to produce the control voltage difference between said input of said electronic switching means and said at least one terminal;

means for charging the at least one inherent capacitance of said active device circuit means when one of the high voltage excursions occurs:

a further electronic circuit having another electronic switching means for switching said at least tne terminal to common, said further electronic circuit being responsive to some others of the command pulses; and disabling means for selectively disabling said further electronic circuit and said active device circuit means from providing the at least one pulse output;

the laundry apparatus further comprising means for sensing current in said motor and, upon the current exceeding a preestablished value, for actuating said disabling means in said at least some of said control means.

43. Laundry apparatus as set forth in claim 42 wherein at least one of said at least some control means includes means for sensing current flowing through said firstnamed electronic switching means and, upon the current exceeding a predetermined level, for disabling said inverting circuit means.

44. Laundry apparatus as set forth in claim 42 wherein said disabling means comprises a flip-flop coupled to said active device circuit means and to said further electronic circuit.

45. Laundry apparatus as set forth in claim 44 wherein said sensing means includes means for sensing current in said motor and, upon the current exceeding the preestablished value, for actuating said flip-flop in said at least some control means.

46. Laundry apparatus comprising:

agitating and spinning means operable generally in a laundering mode for agitating fluid and fabrics to be laundered therein and operable generally in a spin mode for thereafter spinning the fabrics to effect centrifugal displacement of fluid from the fabrics;

an electronically commutated motor including a stationary assembly, a plurality of winding stages adapted to be selectively commutated associated with said stationary assembly and having a plurality of terminals, and rotatable means associated with said stationary assembly and in selective magnetic coupling relation with said winding stages for driving said agitating and spinning means in the laundering mode operation and in the spin mode operation thereof upon the selective commutation of said winding stages;

first and second conductors for supplying power, said second conductor comprising a common; and a plurality of control means for commutating at least some of said winding stages by selectively switching said at least some winding stages at at least one terminal thereof to one of said first and second conductors in response to command pulses applied to said control means, at least some of said control means including:

electronic switching means for switching said at least one terminal to said first conductor, said electronic switching means having an input and being responsive to a control voltage difference between said input and said at least one terminal, said at least one terminal being subject to high voltage excursions relative to common due to the switching of said at least one terminal to said first conductor;

an active device circuit having an active device and at least one output relative to common responsive to successive input pulses;

an inverting circuit including at least one input coupled with said at least one output of said active device circuit, at least one output coupled to said electronic switching means input, a first power lead connected to said at least one terminal, and a second power lead; and a set of diodes, one of said diodes being connected between said at least one output of said active device circuit and said at least one terminal so as to hold said at least one input of said inverting circuit low when said one diode is forward-biased, and another of said diodes coupling said second power lead of said inverting circuit to a low voltage supply connection, said inverting circuit including means for storing power for operation of said inventing circuit during the high voltage excursions.

47. Laundry apparatus as set forth in claim 46 further including a third one of said diodes connected between said at least one output of said active device circuit and said second power lead of said inverting circuit.

48. Laundry apparatus as set forth in claim 46 further including means for sensing current flowing through said electronic switching means and, upon the current exceeding a predetermined level, for disabling said inverting circuit.

49. Laundry apparatus as set forth in claim 46 further including coupling means for coupling said at one output of said inverting circuit to said electronic switching means input, said coupling means including first and second resistors, a third diode and a transistor having a base, emitter, and collector, said third diode being connected across the transistor base and emitter so that the easy-current direction of said third one diode is opposite to the easy-current direction of said transistor base and emitter, said first resistor being connected between said transistor base and said at least one output of said inverting circuit, said second resistor being connected between said transistor collector and said at least one terminal, said transistor emitter being connected to said electronic switching means input.

50. Laundry apparatus as set forth in claim 46 further including a third one of said diodes connected in parallel with a resistor and connected between said at least one output of said active device circuit and said at least one input of said inverting circuit, and a capacitor connected between said at least one input of said inverting circuit and said first power lead.

51. Laundry apparatus as set forth in claim 46 wherein said inverting circuit includes a NOR-gate.

52. Laundry apparatus as set forth in claim 46 wherein said inverting circuit includes a NAND-gate.

53. Laundry apparatus comprising:

agitating and spinning means operable generally in a laundering mode for agitating fluid and fabrics to be laundered therein and operable generally in a spin mode for thereafter spinning the fabrics to effect centrifugal displacement of fluid from the fabrics;

an electronically commutated motor including a stationary assembly, a plurality of winding stages adapted to be selectively commutated associated with said stationary assembly and having a plurality of terminals, and rotatable means associated with said stationary assembly and in selective magnetic coupling relation with said winding stages for driving said agitating and spinning means in the laundering mode operation and in the spin mode operation thereof upon the selective commutation of said winding stages;

first and second conductors for supplying power, said second conductor comprising a common; and a plurality of control means for commutating at least some of said winding stages by selectively switching said at least some winding stages at at least one terminal thereof to one of said first and second conductors in response to electrical pulses, at least some of said control means including:

electronic switching means including a field effect transistor (FET) for switching said at least one terminal to said first conductor, said FET including a first control lead connected to said at least one terminal, a second control lead connected to said first conductor, and a gate, said at least one terminal being subject to high voltage excursions relative to common due to the switching of said at least one terminal to said first conductor;

means for coupling a potential difference to said gate;

a plurality of inverting means including an input, an output, and first and second power leads, respectively, and with one of said inverting means having an inherent capacitance, said input of said one inverting means receiving the electrical impulses, said second power lead of said one inverting means being resistively connected to common, said output of said one inverting means being coupled to said input of another of said inverting means, and said output and said second power lead of said another inverting means supplying the potential difference and being respectively connected to said coupling means and said at least one terminal;

a capacitor connected between said first and second power leads of said another inverting means; and a plurality of diodes, one of said diodes connecting said first power leads of said one and another inverting means to a low voltage supply terminal, and a second and third one of said diodes being connected from said output of said one inverting means to said first and second power leads of said another inverting means, respectively.

54. Laundry apparatus as set forth in claim 53 further including means for sensing the voltage across said capacitor and, upon the capacitor voltage falling below a predetermined level during one of the high voltage excursions, for disabling said another inverting means so that the high voltage excursion temporarily ceases and said capacitor is able to be recharged from said low voltage supply terminal.

55. For use in electrical load powering apparatus having a load connection, high and low voltage supply connections, and a common, and including electronic means for switching the high voltage supply connection to the load connection, the electronic switching means having an input and being responsive to a control voltage difference between the input and the load connection, the load connection being subject to high voltage excursions relative to the common due to the switching, an electronic control circuit comprising:

active device circuit means including a circuit having an active device with at least one output relative to common responsive to successive input pulses;

an inverting circuit having at least one input, at least one output and first and second power leads;

and at least one diode;

said at least one output of said active device circuit means being coupled to said at least one input of said inverting circuit, said at least one output of said inverting circuit being coupled to the electronic switching means input, and said first power lead being connected to the load connection;

said at least one diode being connected between said at least one output of said active device circuit means and the load connection so as to hold said at least one input of said inverting circuit low when said at least one diode is forward-biased;

said second power lead of said inverting circuit being coupled by another diode to the low voltage supply connection, said inverting circuit being able to store power for operation during the high voltage excursions.

56. The electronic control circuit as set forth in claim 55 further comprising at least one additional diode connected between said at least one output of said active device circuit means and said second power lead of said inverting circuit.

57. The electronic control circuit as set forth in claim 55 further comprising means for sensing current flowing through the electronic switching means and upon the current exceeding a predetermined level, for disabling said inverting circuit.

58. The electronic control circuit as set forth in claim 55 further comprising means for coupling said at least one output of said inverting circuit to the electronic switching means input, including first and second resistors, an additional diode and a transistor having a base, emitter, and collector, said additional diode being connected across said transistor base and emitter so that the easy-current direction of said additional diode is opposite to the easy-current direction of said transistor base and emitter, said first resistor being connected between said transistor base and said at least one output of said inverting circuit, said second resistor being connected between said transistor and said load connection, said transistor emitter being connected to the electronic switching means input.

59. The electronic control circuit as set forth in claim 55 further comprising means for coupling said at least one output of said active device circuit means to said at least one input of said inverting circuit, including at least one additional diode connected in parallel with a resistor and connected between said at least one output of said active device circuit means and said at least one input of said inverting circuit, and a capacitor connected between said at least one input and said first power lead.

60. An electronic control circuit for switching a DC supply to a load terminal in response to electrical pulses, the DC supply being returned to a common, the control circuit comprising:

a field effect transistor (FET) having a first control lead connected to the lead terminal, having a second control lead connected to the DC supply, and having a gate;

means for coupling a potential difference to said gate;

first and second inverting means each having an input and an output and first and second power leads, said first inverting means having an inherent capacitance; and a capacitor, and first, second and third diodes;

said first diode connecting said first power leads for both said first and second inverting means to a low voltage supply terminal, said input of said first inverting means being able to receive the electrical pulses and said first inverting means second power lead being resistively connected to the common, said output and second power lead of said second inverting means supplying the potential difference and being respectively connected to said coupling means and said load terminal, said output of said first inverting means being coupled to said input of said second inverting means, said capacitor being connected between said first and second power leads of said second inverting means, said second and third diodes being connected from said first inverter means output to said second inverter means first and second power leads respectively.

61. An electronic control circuit for positively switching electronic switch means for connecting a source of relatively high voltage to an electrical load, the electronic control circuit comprising:

a semiconductor circuit having an input for receiving a command pulse at a relatively low voltage level, said semiconductor circuit having an output and having an inherent capacitance at said output;

an inverting circuit having an input, an output, and first and second power leads;

said output of said semiconductor circuit being connected to said input of said inverting circuit, said input and said first power lead of said inverting circuit being connected by a first resistance, said first and second power leads being connected by a capacitor, said first power lead being connected by a first diode to a low voltage power supply terminal, said output of said inverting circuit and said second power lead comprising output connections to the electronic switch means; and a second diode connected between said output of said semiconductor circuit and said second power lead of said inverting circuit, said second diode means being oriented to charge the inherent capacitance of said semiconductor circuit during the switching.

62. The method as set forth in claim 61 further comprising the step of enabling the producing of said control voltage difference upon the capacitor means voltage rising above a predetermined level so that the high voltage excursion continues.

63. An electronically commutated motor system comprising:

an electronically commutated motor including a stationary assembly having a plurality of winding stages adapted to be selectively commutated, and rotatable means associated with said stationary assembly in selective magnetic coupling relation with said winding stages;

first and second conductors for supplying power, said second conductor constituting a common; and control units for commutating said winding stages by selectively switching said winding stages at respective terminals thereof to said first and second conductors in response to command pulses, each of said control units including:

electronic switching means for switching a respective said terminal to the first conductor, said electronic switching means having an input and being responsive to a control voltage difference between said input and said respective terminal, said respective terminal being subject to high voltage excursions relative to said common due to the switching;

active device circuit means for providing at least one pulse output relative to common in response to at least some of the command pulses and having at least one inherent capacitance;

inverting circuit means connected to said respective terminal for inverting the at least one pulse output of said active device circuit means to produce the control voltage difference between said electronic switching means input and said respective terminal; and means for charging said at least one inherent capacitance of said active device circuit means from said first conductor when one of the high voltage excursions occurs.

64. The electronically commutated motor system as set forth in claim 63 wherein each of said control units further includes means for discharging said at least one inherent capacitance of said active device circuit means when one of the high voltage excursions ceases.

65. The electronically commutated motor system as set forth in claim 63 wherein each of said control units further includes means for sensing current flowing through the electronic switching means and, upon the current exceeding a predetermined level, for disabling said inverting circuit means.

66. The electronically commutated motor system as set forth in claim 63 wherein each of said control units further includes an additional circuit having second electronic means for switching a respective said terminal to common, said additional circuit being responsive to at least some second ones of the command pulses.

67. The electronically commutated motor system as set forth in claim 63 wherein each of said control units further includes an additional circuit having second electronic means for switching a respective said terminal to common, said additional circuit being responsive to at least some second ones of the command pulses and further having means for preventing said active device circuit means from responding to any of the command pulses when one of the second ones of the command pulses is present.

68. The electronically commutated motor system as set forth in claim 63 wherein each of said control units further includes disabling means for selectively disabling said active device circuit means from providing the at least one pulse output, and the electronically commutated motor system further comprises means for sensing load current and, upon the current exceeding a predetermined level, for actuating said disabling means in all of said control units.

69. The electronically commutated motor system as set forth in claim 63 wherein said means for charging said at least one inherent capacitance is connected to said respective terminal.

70. A method of operating apparatus for switching high voltage (HV) direct current (DC) of a source thereof, the apparatus including electronic switch means having an input lead and first and second control leads with the first control lead being connected to the HV source and the HV source being returned to a common and with the HV electronic switch means adapted to change the voltage at the second control lead suddenly to essentially the HV upon the occurrence of a potential difference between the input and the second control lead, the method comprising the steps of:
- providing an electrical pulse relative to the common, the electrical pulse having a duration;
- level-shifting and inverting the electrical pulse away from the common to provide the potential difference relative to the second control lead;
- deriving a voltage from the second control lead voltage when it is changing to the high voltage; and
- substituting the derived voltage for the electrical pulse, and inverting the derived voltage and applying the inverted derived voltage as the potential difference between the input and the second control lead of the electronic switch means.

71. A method for controlling an electronically commutated motor system having an electronically commutated motor including a stationary assembly having a plurality of winding stages adapted to be selectively commutated, and rotatable means associated with the stationary assembly in selective magnetic coupling relation with the winding stages, and means for supplying a high voltage relative to a common and electronic means for switching the high voltage to at least one of the winding stages at a load connection therewith, the electronic switching means having an input and being responsive to a control voltage difference between the input and the load connection, the load connection being subject to high voltage excursions relative to common due to the switching, the method comprising the steps of:
- producing at least one electrical pulse relative to common from a circuit having at least one inherent capacitance;
- level-shifting and inverting the at least one electrical pulse to produce the control voltage difference between the electronic switching means input and the load connection; and
- charging the at least one inherent capacitance from the high voltage when one of the high voltage excursions occurs.

72. The method as set forth in claim 71 wherein the charging step includes charging the at least one inherent capacitance from the load connection.

73. The method as set forth in claim 71 further comprising the step of discharging the at least one inherent capacitance when one of the high voltage excursions ceases.

74. The method as set forth in claim 71 further comprising the steps of sensing current flowing through the electronic switching means and performing the level-shifting and inverting step only when the current is less than a predetermined level.

75. A method for controlling an electronically commutated motor system having an electronically commutated motor including a stationary assembly having a plurality of winding stages adapted to be selectively commutated, and rotatable means associated with the stationary assembly in selective magnetic coupling relation with the winding stages, first and second conductors for supplying power, the second conductor constituting a common, and control units for commutating the winding stages and causing a current to flow in the motor by selectively switching the winding stages at respective terminals thereof to the first and second conductors in response to command pulses, each of the control units including electronic means for switching a respective terminal to the first conductor, the electronic switching means having an input and being responsive to a control voltage difference between the input and said respective terminal, the respective terminal being subject to high voltage excursions relative to said common due to the switching, the method comprising performing in each of the control units the steps of:
- providing in response to at least one of the command pulses at least one electrical pulse relative to common from a circuit having at least one inherent capacitance;
- level-shifting and inverting the at least one electrical pulse to produce the control voltage difference between the electronic switching means input and the respective terminal;
- charging the at least one inherent capacitance from the first conductor when one of the high voltage excursions occurs; and
- sensing the motor current and, upon the current exceeding a predetermined level, inhibiting the electrical pulse providing step.

76. The method as set forth in claim 75 further comprising the step of discharging the at least one inherent capacitance when one of the high voltage excursions ceases.

77. The method as set forth in claim 75 wherein each of the control units is able to switch a respective terminal to common in response to second ones of the command pulses, the method further comprising the step of inhibiting the electrical pulse providing step when one of the second ones of the command pulses is present.

78. The method as set forth in claim 75 wherein the charging step includes charging the at least one inherent capacitance from the respective terminal.

79. An electronic control circuit for connection by first and second conductors to means for supplying a rectified A.C. voltage, comprising:
- first and second capacitors connected to each other at a node and connected in series across the first and second conductors;
- means for utilizing electrical energy having first and second terminals, said first terminal being connected to said first and second capacitors at said first node; and
- a control unit for alternately switching said second terminal of said electrical energy utilization means to the first and second conductors in response to command pulses, said control unit including:
  - electronic switching means for switching said second terminal to the first conductor, said electronic switching means having an input and being responsive to a control voltage difference between said input and said second terminal, said second terminal being subject to high voltage excursions relative to the second conductor due to the switching;
  - active device circuit means for providing at least one pulse output relative to the second conductor in response to at least some of the command pulses and having at least one inherent capacitance;
  - circuit means connected to said second terminal for inverting the at least one pulse output of said active device circuit means to produce the control voltage difference between said electronic switching means input and said second terminal; and
  - means for charging said at least one inherent capacitance of said active device circuit means when one of the high voltage excursions occurs.

80. The electronic control circuit as set forth in claim 79 wherein said control unit further includes means for discharging said at least one inherent capacitance of said active device circuit means when one of the high voltage excursions ceases.

81. The electronic control circuit as set forth in claim 79 wherein said control unit further includes an additional circuit having second electronic means for switching said second terminal to the second conductor, said additional circuit being responsive to at least some second ones of the command pulses.

82. The electronic control circuit as set forth in claim 79 wherein said means for utilizing electrical energy includes a transformer with a first winding having said first and second terminals and a second winding and further includes means for rectifying and filtering a voltage appearing across said second winding to produce a supply voltage; and the electronic control circuit further comprises means for sensing departures from a preselected value of the supply voltage and means responsive to said sensing means for supplying the command pulses variably to counteract the departures.

83. The electronic control circuit as set forth in claim 82 further comprising optoelectronic means for coupling the command pulses to said control unit from said means for supplying the command pulses variably.

84. For use in electrical load powering apparatus having a load connection, a high voltage supply connection and a common, and including electronic means for switching the high voltage supply connection to the load connection, the electronic switching means having an input and being responsive to a control voltage difference between the input and the load connection, the load connection being subject to high voltage excursions relative to the common due to the switching, an electronic control circuit comprising:
circuit means connected to the load connection for producing the control voltage difference between the electronic switching means input and the load connection, the circuit means for producing the control voltage difference having capacitor means for storing a voltage from a second supply voltage connection so that said circuit means is able to be powered during the high voltage excursions; and
means for sensing the voltage across said capacitor means and, upon the capacitor means voltage falling below a predetermined level during one of the high voltage excursions, for disabling said circuit means so that the high voltage excursion temporarily ceases and said capacitor means is able to be recharged from the second supply voltage connection.

85. The electronic control circuit as set forth in claim 84 further comprising active device circuit means for providing at least one pulse output relative to common to said circuit means for producing the control voltage difference between the electronic switching means input and the load connection.

86. The electronic control circuit as set forth in claim 85 wherein said circuit means for producing the control voltage difference includes means for inverting the at least one pulse output of the active device circuit means.

87. The electronic control circuit as set forth in claim 85 wherein said active device circuit means has at least one inherent capacitance and further comprising means for charging said at least one inherent capacitance of said active device circuit means when one of the high voltage excursions occurs.

88. The electronic control circuit as set forth in claim 87 wherein said means for charging includes a diode connected from the load connection to an input of said circuit means for producing the control voltage difference.

89. The electronic control circuit as set forth in claim 87 further comprising means for discharging said at least one inherent capacitance of said active device circuit means when one of the high voltage excursions ceases.

90. The electronic control circuit as set forth in claim 89 wherein said means for discharging comprises a diode and a capacitor connected in series from said load connection to an input of said circuit means for producing the control voltage difference.

91. The electronic control circuit as set forth in claim 85 wherein said sensing means includes a transistor circuit having an output which changes state when the voltage of the capacitor means falls below a predetermined level, and said circuit means for producing the control voltage difference includes a NOR-gate having a first input fed by the ouput of said transistor circuit and a second input fed by the at least one pulse output of said active device circuit means.

92. The electronic control circuit as set forth in claim 91 wherein said transistor circuit includes first and second resistors and a transistor having a base, emitter and collector, said first and second resistors connected in series across said capacitor means, said first resistor connected between the base and emitter of said transistor and said first input of said NOR-gate fed by the collector of said transistor.

93. The electronic control circuit as set forth in claim 84 wherein said circuit means includes a diode connected between said capacitor means and said second voltage connection so that said capacitor means can be charged from the second supply voltage connection.

94. The electronic control circuit as set forth in claim 93 wherein said capacitor means is connected between the load connection and said diode.

95. An electronically commutated motor system comprising:
an electronically commutated motor including a stationary assembly having a plurality of winding stages adapted to be selectively commutated, and rotatable means associated with said stationary assembly in selective magnetic coupling relation with said winding stages;
first and second conductors for supplying power, said second conductor constituting a common; and
control units for commutating said winding stages by selectively switching said winding stages at respective terminals thereof to said first and second conductors in response to command pulses, each of said control units including:
electronic switching means for switching a respective said terminal to the first conductor, said electronic switching means having an input and being responsive to a control voltage difference between said input and said respective terminal, said respective terminal being subject to high voltage excursions relative to said common due to the switching;
circuit means connected to said respective terminal for producing the control voltage difference between the electronic switching means input and said respective terminal, the circuit means for producing the control voltage difference having capacitor means for storing a voltage from a second supply voltage connection so that said circuit means for producing the control voltage difference is able to be powered during the high voltage excursions; and means for sensing the voltage across said capacitor means and, upon the capacitor means voltage falling below a predetermined level during one of the high voltage excursions, for disabling said circuit means so that the high voltage excursion temporarily ceases and said capacitor means is able to be recharged from the second supply voltage connection.

96. The electronically commutated motor system as set forth in claim 95 wherein said circuit means includes a diode connected between said capacitor means and said second supply voltage connection so that said capacitor means can be charged from the second supply voltage connection.

97. The electronically commutated motor system as set forth in claim 96 wherein said capacitor means is connected between said respective terminal and said diode.

98. The electronically commutated motor system as set forth in claim 95 further comprising active device circuit means for providing at least one pulse output relative to common to said circuit means for producing the control voltage difference between the electronic switching means input and said respective terminal.

99. The electronically commutated motor system as set forth in claim 98 wherein said sensing means includes a transistor circuit having an output connected to said circuit means for producing the control voltage difference which output changes state when the voltage of the capacitor means falls below the predetermined level, and said circuit means for producing the control voltage difference includes a NOR gate having a first input fed by the ouput of said transistor circuit and a second input fed by the at least one pulse output of said active device circuit means.

100. The electronically commutated motor system as set forth in claim 99 wherein said transistor circuit includes first and second resistors and a transistor having a base, emitter and collector, said first and second resistors connected in series across said capacitor means, said first resistor connected between the base and emitter of said transistor and said first input of said NOR-gate fed by the collector of said transistor.

101. Laundry apparatus comprising:
means operable generally in a laundering mode for agitating fluid and fabrics to be laundered therein and operable generally in a spin mode for thereafter spinning the fabrics to effect centrifugal displacement of fluid from the fabrics;

an electronically commutated motor including a stationary assembly having a plurality of winding stages adapted to be selectively commutated, and rotatable means associated with said stationary assembly in selective magnetic coupling relation with said winding stages for driving said agitating and spinning means in the laundering mode operation and in the spin mode operation thereof upon the commutation of said winding stages;

first and second conductors for supplying power, said second conductor constituting a common; and control units for commutating said winding stages by selectively switching said winding stages at respective terminals thereof to said first and second conductors in response to command pulses, each of said control units including:

electronic switching means for switching a respective said terminal to said first conductor, said electronic switching means having an input and being responsive to a control voltage difference between said input and said respective terminal, said respective terminal being subject to high voltage excursions relative to said common due to the switching;

circuit means connected to said respective terminal for producing the control voltage difference between the electronic switching means input and said respective terminal in response to the command pulses, the circuit means for producing the control voltage difference having capacitor means for storing a voltage from a second supply voltage connection so that said circuit means for producing the control voltage difference is able to be powered during the high voltage excursions; and sensing means for sensing the voltage across said capacitor means and, upon the capacitor means voltage falling below a predetermined level during one of the high voltage excursions, for disabling said circuit means so that the high voltage excursion temporarily ceases and said capacitor means is able to be recharged from the second supply voltage connection.

102. Laundry apparatus as set forth in claim 101 wherein said circuit means includes a diode connected between said capacitor means and said second voltage connection so that the capacitor means can be charged from the second supply voltage connection.

103. Laundry apparatus as set forth in claim 102 wherein the capacitor means is connected between said respective terminal and said diode.

104. Laundry apparatus as set forth in claim 101 further comprising active device circuit means for providing at least one pulse output relative to common to said circuit means for producing the control voltage difference between the electronic switching means input and said respective terminal.

105. Laundry apparatus as set forth in claim 104 wherein said sensing means includes a transistor circuit having an output connected to said circuit means for producing the voltage difference which output changes state when the voltage of the capacitor means falls below the predetermined level, and said circuit means for producing the control voltage difference includes a NOR-gate having a first input fed by the ouput of said transistor circuit and a second input fed by the at least one pulse output of said active device circuit means.

106. Laundry apparatus as set forth in claim 105 wherein said transistor circuit includes first and second resistors and a transistor having a base, emitter and collector, said first and second resistor connected in series across said capacitor means, said first resistor connected between the base and emitter of said transistor and said first input of said NOR-gate fed by the collector of said transistor.

107. A method of operating apparatus for switching a first voltage from a source thereof, the apparatus including electronic switch means having an input lead and first and second control leads with the first control lead connected to the source and the source being returned to a common and a drive circuit means for producing a control voltage between the input and second control lead and the electronic switch means being adapted to change the voltage at the second control lead suddenly to essentially the first voltage upon the occurrence of said control voltage, the method comprising the steps of:

storing a voltage from a second supply voltage terminal in capacitor means so that the drive circuit means is able to be powered when the voltage at the second control lead is changed to essentially the first voltage;

sensing the voltage across said capacitor means; and disabling the production of said control voltage difference upon the capacitor means voltage falling below a predetermined level when the second control lead voltage is essentially the first voltage so that the first voltage temporarily ceases and said capacitor means is able to be recharged from said second supply voltage terminal.

108. The method as set forth in clam 107 further comprising the step of enabling the production of said control voltage upon the capacitor means voltage rising above a predetermined level so that the second control lead voltage returns to essentially the first voltage.

109. A method for controlling an electronically commutated motor system having an electronically commutated motor including a stationary assembly having a plurality of winding stages adapted to be selectively commutated, and rotatable means associated with the stationary assembly in selective magnetic coupling relation with the winding stages, and means for supplying a high voltage relative to a common and electronic means for switching the high voltage to at least one of the winding stages at a load connection therewith, the electronic switching means having an input and being responsive to a control voltage difference between the input and the load connection, the load connection being subject to high voltage excursions relative to common due to the switching, the method comprising the steps of:

producing the control voltage difference between the electronic switching means input and the load connection;

storing a voltage on capacitor means for a second supply voltage connection so that said circuit means is able to be powered during one one of the high voltage excursions;

sensing the voltage across said capacitor means; and disabling the production of said control voltage upon the capacitor means voltage falling below a predetermined level during one of the high voltage excursions so that the high voltage excursion temporarily ceases and said capacitor means is able to be recharged from the second supply voltage connection.

110. For use in electrical load powering apparatus having a load connection, a high voltage supply connection and a common, and including electronic means for switching the high voltage supply connection to the load connection, the electronic switching means having an input and being responsive to a control voltage difference between the input and the load connection, the load connection being subject to high voltage excursions relative to the common due to the switching, an electronic control circuit comprising:

active device circuit means for providing at least one pulse output relative to common;

circuit means having an input responsive to an input voltage relative to the load connection for inverting the at least one pulse output of said active device circuit means to produce the control voltage difference between the electronic switching means input and the load connection; and means connected to the load connection for applying a voltage to the input of the inverting circuit means when one of the high voltage excursions occurs to latch the control voltage difference between the electronic switching means input and the load connection.

111. The electronic control circuit as set forth in claim 110 wherein the means for applying voltage includes a diode connected between the load connection and said input for said inverting circuit means.

112. The electronic control circuit as set forth in claim 110 wherein the means for applying voltage includes means for coupling the active device circuit means to the input of said inverting circuit means and bypassing stray voltages at that input.

113. The electronic control circuit as set forth in claim 112 wherein said coupling and bypassing means includes a diode in parallel with a resistor and connected between said active device circuit means output and said input of said inverting means, and a capacitor connected between the inverting means input and the load connection.

114. The electronic control circuit as set forth in claim 110 wherein said active device circuit means has at least one inherent capacitance and the means for applying voltage includes means for charging said at least one inherent capacitance when one of the high voltage excursions occurs.

115. An electronically commutated motor system comprising:

an electronically commutated motor including a stationary assembly having a plurality of winding stages adapted to be selectively commutated, and rotatable means associated with said stationary assembly in selective magnetic coupling relation with said winding stages;

first and second conductors for supplying power, said second conductor constituting a common; and control units for commutating said winding stages by selectively switching said winding stages at respective terminals thereof to said first and second conductors in response to command pulses, each of said control units including:

electronic switching mean for switching a respective said terminal to the first conductor, said electronic switching means having an input and being responsive to a control voltage difference between said input and said respective terminal, said respective terminal being subject to high voltage excursions relative to said common due to the switching;

active device circuit means for providing at least one pulse output relative to common in response to at least some of the command pulses;

inverting circuit means having an input responsive to an input voltage relative to said respective terminal for inverting the at least one pulse output of said active device circuit means to produce the control voltage difference between said electronic switching means input and said respective terminal; and means connected to said respective terminal for applying a voltage to the input of the inverting circuit means when one of the high voltage excursions occurs to latch the control voltage difference between the electronic switching means input and said respective terminal.

116. The electronically commutated motor as set forth in claim 115 wherein the means for applying voltage includes a diode connected between said respective terminal and said inverting means input.

117. The electronically commutated motor as set forth in claim 115 wherein the means for applying voltage includes means for coupling the active device circuit means to the input of said inverting circuit means and bypassing stray voltages at that input.

118. The electronically commutated motor as set forth in claim 117 wherein the coupling and bypassing means includes a diode in parallel with a resistor and connected between said active device circuit means output and said inverting means input, and a capacitor connected between said inverting means input and said respective terminal.

119. The electronically commutated motor as set forth in claim 115 wherein said active device circuit means has at least one inherent capacitance and said voltage applying means includes means for charging said at least one inherent capacitance when one of the high voltage excursions occurs.

120. Laundry apparatus comprising:
means operable generally in a laundering mode for agitating fluid and fabrics to be laundered therein and operable generally in a spin mode for thereafter spinning the fabrics to effect centrifugal displacement of fluid from the fabrics;
an electronically commutated motor including a stationary assembly having a plurality of winding stages adapted to be selectively commutated, and rotatable means associated with said stationary assembly in selective magnetic coupling relation with said winding stages for driving said agitating and spinning means in the laundering mode operation and in the spin mode operation thereof upon the commutation of said winding stages;
first and second conductors for supplying power, said second conductor constituting a common; and
control units for commutating said wind stages by selectively switching said winding stages at respective terminals thereof to said first and second conductors in response to command pulses, each of said control units including:
electronic switching means for switching a respective said terminal to said first conductor, said electronic switching means having an input and being responsive to a control voltage difference between said input and said respective terminal, said respective terminal being subject to high voltage excursions relative to said common due to the switching;
active device circuit means for providing at least one pulse output relative to common in response to at least some of the command pulses;
inverting circuit means having an input responsive to an input voltage relative to said respective terminal for inverting the at least one pulse output of said active device circuit means to produce the control voltage difference between the electronic switching means input and said respective terminal; and
voltage applying means connected to said respective terminal for applying a voltage to the input of the inverting circuit means when one of the high voltage excursions occurs to latch the control voltage difference between the electronic switching means input and said respective terminal.

121. Laundry apparatus as set forth in claim 120 wherein said voltage applying means includes a diode connected between said respective terminal and said inverting means input.

122. Laundry apparatus as set forth in claim 120 wherein said voltage applying means includes means for coupling the active device circuit means to the input of said inverting circuit means and bypassing stray voltages at that input.

123. Laundry apparatus as set forth in claim 122 wherein the coupling and bypassing means includes a diode in parallel with a resistor and connected between said active device circuit means output and said inverting means input, and a capacitor connected between said inverting means input and said respective terminal.

124. Laundry apparatus as set forth in claim 120 wherein said active device circuit means has at least one inherent capacitance and said voltage applying means includes means for charging said at least one inherent capacitance when one of the high voltage excursions occurs.

125. A method of operating electrical load powering apparatus having a load connection, a high voltage supply connection and a common, and including electronic means for switching the high voltage supply connection to the load connection, the electronic switching means having an input and being responsive to a control voltage difference between the input and the load connection, the load connection being subject to high voltage excursions relative to the common due to the switching, the method comprising:
providing at least one pulse relative to common;
inverting with respect to the load connection the at least one pulse to provide the control voltage difference between the electronic switching means input and the load connection;
producing a voltage with respect to the load connection during one of the high voltage excursions; and
inverting the produced voltage to latch the control voltage difference between the electronic switching means input and the load connection when one of the high voltage excursions occurs.

126. The method as set forth in claim 125 wherein the at least one pulse is provided from a circuit having at least one inherent capacitance and further comprising the step of charging the at least one inherent capacitance from the high voltage supply connection when one of the high voltage excursions occurs.

* * * * *